United States Patent
Franzas et al.

(10) Patent No.: US 10,576,372 B2
(45) Date of Patent: Mar. 3, 2020

(54) ELECTRONIC DEVICE FOR FACILITATING USER INTERACTIONS WITH GRAPHICAL USER INTERFACE

(71) Applicant: Supercell Oy, Helsinki (FI)

(72) Inventors: Jon Franzas, Helsinki (FI); Timur Haussila, Helsinki (FI); Touko Tahkokallio, Espoo (FI)

(73) Assignee: SUPERCELL OY, Helsinki (FI)

(*) Notice: Subject to any disclaimer, the term of this patent is extended or adjusted under 35 U.S.C. 154(b) by 0 days.

(21) Appl. No.: 14/052,076

(22) Filed: Oct. 11, 2013

(65) Prior Publication Data
US 2015/0105147 A1 Apr. 16, 2015

(51) Int. Cl.
*A63F 13/00* (2014.01)
*A63F 13/42* (2014.01)
(Continued)

(52) U.S. Cl.
CPC .............. *A63F 13/42* (2014.09); *A63F 13/30* (2014.09); *A63F 13/40* (2014.09); *A63F 13/45* (2014.09);
(Continued)

(58) Field of Classification Search
CPC .................................. A63F 13/00; A63F 13/45
(Continued)

(56) References Cited

U.S. PATENT DOCUMENTS

| 8,448,095 B1 | 5/2013 | Haussila et al. |
| 2002/0060427 A1 | 5/2002 | Hinami |

(Continued)

FOREIGN PATENT DOCUMENTS

| CN | 101604222 A | 12/2009 |
| CN | 201535891 U | 7/2010 |

(Continued)

OTHER PUBLICATIONS

Kane & Lynch game manual www.replacementdocs.com.*
(Continued)

*Primary Examiner* — David L Lewis
*Assistant Examiner* — Eric M Thomas
(74) *Attorney, Agent, or Firm* — Ziegler IP Law Group, LLC

(57) ABSTRACT

An electronic device is provided. The electronic device includes a display screen and a computing hardware. The computing hardware is operable to execute a software product, wherein executing the software product results in generating and rendering a graphical user interface on the display screen, the graphical user interface being configured to facilitate user interactions, the computing hardware, the software product and the graphical user interface being implemented on a gaming system, the gaming system comprising a game, wherein the software product, when executed on the computing hardware, is configured to present a first view on the graphical user interface, present one or more user-selectable graphical objects on the graphical user interface, detect a user's selection of one of the one or more of the user-selectable graphical objects to be deployed in the first view on the graphical user interface, detect a user's selection of a deploy point on the first view, and execute deployment of the one of the one or more of the user-selectable graphical objects to the first view of the graphical user interface, wherein other set of graphical objects emerge from the one or more user-selectable graphical object and enter to the first view from one or more areas in a proximity of the deploy point.

28 Claims, 15 Drawing Sheets

(51) Int. Cl.
- *G06F 16/44* (2019.01)
- *A63F 13/837* (2014.01)
- *A63F 13/40* (2014.01)
- *A63F 13/833* (2014.01)
- *A63F 13/45* (2014.01)
- *A63F 13/30* (2014.01)
- *A63F 13/537* (2014.01)
- *A63F 13/822* (2014.01)
- *H04L 12/24* (2006.01)

(52) U.S. Cl.
CPC .......... *A63F 13/537* (2014.09); *A63F 13/822* (2014.09); *A63F 13/833* (2014.09); *A63F 13/837* (2014.09); *G06F 16/444* (2019.01); *H04L 41/22* (2013.01); *A63F 2300/807* (2013.01)

(58) Field of Classification Search
USPC ....................................................... 463/1, 31
See application file for complete search history.

(56) References Cited

U.S. PATENT DOCUMENTS

| | | | |
|---|---|---|---|
| 2002/0082080 A1* | 6/2002 | Kojima | A63F 13/10 463/31 |
| 2003/0008696 A1 | 1/2003 | Abecassis et al. | |
| 2004/0048643 A1 | 3/2004 | Lauter | |
| 2005/0037826 A1 | 2/2005 | Rupert et al. | |
| 2006/0267955 A1 | 11/2006 | Hino | |
| 2007/0270226 A1 | 11/2007 | York et al. | |
| 2012/0142429 A1 | 6/2012 | Muller | |

FOREIGN PATENT DOCUMENTS

| | | |
|---|---|---|
| JP | 2002000939 A | 1/2002 |
| JP | 2005152318 A | 6/2005 |
| JP | 2006318392 A | 11/2006 |
| KR | 10-2008-0080657 | 9/2008 |
| WO | 2007072019 | 6/2007 |
| WO | 2007072019 A2 | 6/2007 |

OTHER PUBLICATIONS

Dynasty Warriors 5 game manual www.replacementdocs.com.*
Kane & Lynch.*
Dynasty Warriors 5.*
Notice of Non-Final Rejection, Korean Intellectual Property Office, Application No. 10-2014-0089905, Dated May 27, 2015.
"Battle Countries-Improved", Sony Computer Entertainment Inc., Sep. 18, 1998, pp. 4-6, 16, 26-28, 33-34, 51, 60-62, 66, 74-76, 80.
"Age of Mythology, Giant Gods in Atlatnitis", Game Watch, Impress Inc., Nov. 28, 2003 URL http;//game.watch.impress.co.jp/docs/20031128/aomtt.htm.
Korean Intellectual Property Office Notice of Non-Final Rejection for App No. 10-2014-0089905, dated May 27, 2015, 4 pages.
"Fighting Nation Improved", Manuel 2000-00730-001, Yasuhiro Kawamata, Soliton Software, Sony Entertainment Inc., 1997, 49 pages.
"Project Minerva Mission Navigate File", 1st edition, Media Factory Inc., Aug. 29, 2002 p. 017.
"Age of Mythology: The Titans" Game Review, Nov. 28, 2003, 15 pages.
Civilization Fanatics, Civ5—Mod Components, http://forums.civfanatics.com/showthread.php?t=42484, Jun. 25, 2011, 6 pages.
Big Phil, Six Tips on Crushing Your Enemies in Civilization V, http://www.escapistmagazine.com/forums/read/6.246477-Six-Tips-on-Crushing-Your-Enemies-in-Civilization-V, Nov. 23, 2010, 1 page.
Wikia, C-evo HOWTO:Units, http://civilization.wikia.com/wiki/C-evo_HOWTO:_Units, May 12, 2012, 3 pages.
NorthStarGuide, Civilization V Battle Tactics, http://blog.gameagent.com/the-art-of-war-from-a-us-marine-civilization-v-battle-tactics-part-2/, May 13, 2011, 6 pages.
Civilization Fanatics Center, Civilization IV: Units, http://www.civfanatics.com/civ4/info/units, Jan. 25, 2007, 15 pages.
Civilization Revolution, Units, http://www.civilizationrevolution.com/iphone/manual/units.html, 2009, 4 pages.
"Starcraft the Board Game Rule book in Chinese" Oct. 30, 2012, Retrieved at http://wenku.baidu.com/view/a991e70516fc700abb68fcb6.html, 27 Pages.
China First Office Action, Application No. 201410289023.9, dated Jan. 24, 2017, 7 pages.
Examination Report received for Australian Patent Application No. AU2014333726, dated May 31, 2019, 06 pages.
"AOE3—What is shift clicking? How to shift click—Tips & Tricks #002 with Interjection!", Youtube, Retrieved on Jul. 19, 2019, 4 pages. Available at: https://www.youtube.com/watch?v=eKmWcJayO84.
"Rise of Nations—War in Germany", Youtube, Retrived on Jul. 19, 2019, 7 pages. Available at: http://www.youtube.com/watch?v=fqR5cT0kWv0.
"Rome: Total War—Julii Let's Play—Part 1"Youtube, Retrived on Jul. 19, 2019, 3 pages. Available at: https://www.youtube.com/watch?v=7jNAWgC0bdQ.

* cited by examiner

ELECTRONIC DEVICE FOR FACILITATING USER INTERACTIONS WITH GRAPHICAL USER INTERFACE

TECHNICAL FIELD

The present disclosure relates generally to gaming systems, and more specifically, to electronic devices for facilitating user interactions with a graphical user interface. Moreover, the present disclosure relates to methods of facilitating user interactions with a graphical user interface. Furthermore, the present disclosure also relates to software products stored on non-transitory (non-transient) machine-readable data storage media, wherein the software products are executable upon computing hardware of an electronic device to implement the aforesaid methods.

BACKGROUND

Today, various electronic devices have been developed to provide user-friendly interfaces for facilitating easy and quick user interaction. Examples of such electronic devices include, but are not limited to, smart phones, Mobile Internet Devices (MIDs), phablet computers, tablet computers, Ultra-Mobile Personal Computers (UMPCs), Personal Digital Assistants (PDAs), web pads, handheld Personal Computers (PCs), laptop computers, interactive entertainment computers, and gaming terminals. Most of these electronic devices include touch-sensitive display screens, which make them more user-friendly and easier to use.

In order to provide entertaining experience to users, various gaming systems may be implemented on such electronic devices. An important aspect of a gaming system implemented on an electronic device is an ease with which a user can interact with a user interface of a game to control various operations of the game.

FIG. 1 is a schematic illustration of a known conventional user interface of an example gaming system for implementation on an electronic device; FIG. 1 represents prior art. The example gaming system includes a war strategy game in which a user's purpose is to build and expand his/her territory, for example, by attacking one or more territories owned by other users or simulated opponents.

FIG. 1 depicts an example game view 100 of the example gaming system. The example game view 100 shows an enemy territory being attacked by the user. The enemy territory includes a land region 102 and a shore region 104. A plurality of target objects, depicted as a target object 106a and a target object 106b in FIG. 1, are positioned in the land region 102. The user is typically required to destroy the target objects 106a and 106b to defeat his/her enemy.

In order to attack the target objects 106a and 106b, the user deploys a plurality of war-ships on the shore region 104, depicted as a war-ship 108a, a war-ship 108b and a war-ship 108c in FIG. 1 (hereinafter collectively referred to as war-ships 108).

Typically, the user may deploy the war-ships 108 by selecting a desired place on the shore region 104, for example, by tapping with a finger or clicking with a pointer object. In an example situation where the user wishes to attack on the target object 106a, before attacking the target object 106b, the user deploys the war-ships 108 as close to the target region 106a as is possible. The war-ships 108 may typically be deployed beside each other.

Consequently, troops emerging from the war-ships 108a and 108b enter the enemy territory via target routes 110a and 110b, respectively, as shown in FIG. 1. These troops attack on the target object 106a, as the user desired.

However, space available on the shore region 104 is often limited. In a situation where the war-ship 108c is deployed after the war-ships 108a and 108b have been deployed, the war-ship 108c is forced to be deployed in a proximity of the target object 106b, as shown in FIG. 1. The war-ship 108c may, for example, be deployed in a place from where both the targets 106a and 106b are substantially equally distant.

Consequently, troops emerging from the war-ship 108c have two possible target routes, depicted as target routes 110c and 110d. The target route 110c leads the troops to the target object 106a, while the target route 110d leads the troops to the target object 106b. As the troops select a shortest target route from amongst the target routes 110c and 110d automatically, it is not possible for the user to select a route from which the user would want the troops to enter. In a situation where the target route 110d is the shortest target route, the troops emerging from the war-ship 108c attack the target object 106b, instead of the target object 106a. This makes it impossible for the user to control deployment of these troops. As a result, the user may find it difficult to define a war strategy as per his/her desire.

Therefore, there exists a need for a graphical user interface that enables a user to define a strategy as per his/her desire.

SUMMARY

The present disclosure seeks to provide an electronic device.

The present disclosure also seeks to provide a method of facilitating user interactions with a graphical user interface.

In one aspect, embodiments of the present disclosure provide an electronic device. The electronic device includes a display screen and a computing hardware. The computing hardware is operable to execute a software product, which results in generating and rendering a graphical user interface on the display screen. The graphical user interface is configured to facilitate user interactions. The computing hardware, the software product and the graphical user interface are implemented on a gaming system. In an embodiment of the present disclosure, the gaming system includes a war strategy game.

The software product, when executed on the computing hardware, is configured to present a first view of a map on the graphical user interface. The first view of the map displays an enemy territory. The software product, when executed on the computing hardware, is also configured to present one or more user-selectable graphical objects on the graphical user interface. The one or more user-selectable graphical objects may, for example, include one or more troop transportation units.

Additionally, the software product, when executed on the computing hardware, is configured to detect a user's selection of one of the one or more troop transportation units to be deployed to attack the enemy territory, and detect a user's selection of a deploy point on the enemy territory. The software product, when executed on the computing hardware, is configured to execute deployment of the one of the one or more troop transportation units on the enemy territory, upon detection of the user's selections. Consequently, troops emerging from the one of the one or more troop transportation units enter the enemy territory from one or more areas in a proximity of the deploy point.

Apart from the one or more troop transportation units, the one or more user-selectable graphical objects may also include one or more supplemental fires. The software product, when executed on the computing hardware, is optionally configured to detect a user's selection of one of the one or more supplemental fires to be fired, and detect a user's selection of a fire point on the enemy territory. Accordingly, the software product, when executed on the computing hardware, is optionally configured to execute firing of the one of the one or more supplemental fires on the fire point selected on the enemy territory, upon detection of the user's selections.

In an embodiment of the present disclosure, the one of the one or more supplemental fires is a flash fire that, when fired, re-directs the troops to pass through one or more areas in a proximity of the fire point.

Moreover, the software product, when executed on the computing hardware, is optionally configured to levy a cost of usage of the one of the one or more supplemental fires. Optionally, the cost of usage may be substantially different for each usage of the one of the one or more supplemental fires. In an embodiment of the present disclosure, the cost of usage increases with each usage of the one of the one or more supplemental fires. In another embodiment of the present disclosure, the cost of usage increases after the one of the one or more supplemental fires has been used a predefined number of times.

Moreover, the software product, when executed on the computing hardware, is configured to present a second view of the map on the graphical user interface. The second view of the map displays one or more user-owned territories and one or more enemy territories. Accordingly, the software product, when executed on the computing hardware, is configured to enable a user's selection of one of the one or more enemy territories to be attacked.

The second view of the map optionally includes one or more visible areas and one or more at-least-partially-hidden areas. In such a situation, the software product, when executed on the computing hardware, is optionally configured to present a user-selectable map-resource object on the graphical user interface, detect a user's selection of the user-selectable map-resource object, and present a third view of the map on the graphical user interface. Based at least partially upon the user's selection of the user-selectable map-resource object, at least one of the one or more at-least-partially-hidden areas of the second view of the map is made visible on the third view of the map.

In an example embodiment of the present disclosure, the user-selectable map-resource object includes a radar. Accordingly, the software product, when executed on the computing hardware, is optionally configured to present a user-selectable upgrade option on the graphical user interface, and detect a user's selection of the user-selectable upgrade option. The software product, when executed on the computing hardware, is optionally configured to upgrade the user-selectable map-resource object, based at least partially upon the user's selection of the user-selectable upgrade option. Consequently, the at least one of the one or more at-least-partially-hidden areas is made visible when the user-selectable map-resource object is upgraded.

The software product, when executed on the computing hardware, is optionally configured to levy a cost of usage of the user-selectable map-resource object.

In order to detect user's selections, the electronic device also includes a user input interface rendered over the graphical user interface. The user input interface is configured to detect an input corresponding to moving a pointer object, clicking or tapping the pointer object, or swiping a touch-sensitive object over the graphical user interface.

Moreover, the electronic device optionally includes a database for substantially continuously recording and updating changes in status of the one or more user-selectable graphical objects. The software product, when executed on the computing hardware, is coupled to the database. The software product, when executed on the computing hardware, is optionally configured to resume the status of the one or more user-selectable graphical objects to their last updated status in the database, in case of interruptions in the operable state of the graphical user interface.

In an embodiment of the present disclosure, a plurality of electronic devices are coupled in communication with a server via a communication network. Graphical user interfaces are generated temporally concurrently on display screens of the plurality of electronic devices, to facilitate interactions of a plurality of users with the graphical user interfaces. Beneficially, the graphical user interfaces generated on the plurality of electronic devices are coordinated and synchronized through the server, and updated on the plurality of electronic devices concurrently with time.

Examples of these electronic devices include, but are not limited to, mobile phones, smart telephones, Mobile Internet Devices (MIDs), tablet computers, Ultra-Mobile Personal Computers (UMPCs), phablet computers, Personal Digital Assistants (PDAs), web pads, Personal Computers (PCs), Handheld PCs, laptop computers, desktop computers, Network-Attached Storage (NAS) devices, large-sized touch screens with embedded PCs, and interactive entertainment devices, such as game consoles, Television (TV) sets and Set-Top Boxes (STBs).

In another aspect, embodiments of the present disclosure provide a method of facilitating user interactions with the graphical user interface.

In yet another aspect, embodiments of the present disclosure provide a software product stored on non-transitory (non-transient) machine-readable data storage media, wherein the software product is executable upon computing hardware of the electronic device for implementing the aforementioned method. The software product may, for example, be downloadable from a software application store to the electronic device.

Embodiments of the present disclosure substantially eliminate, or at least partially address, the aforementioned problems in the prior art, and enable users to control deployment of troops, thereby enabling the users to define a war strategy as per their desire.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
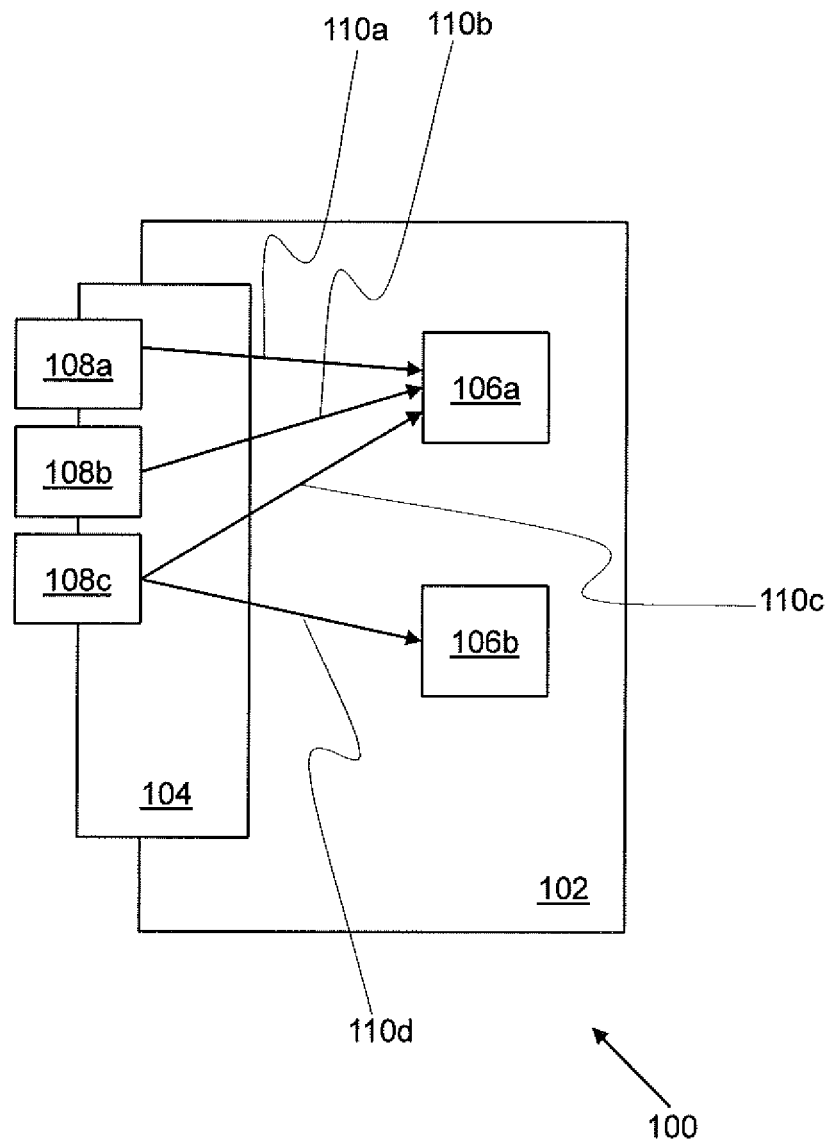
FIG. 1 (Prior Art) is a schematic illustration of a known conventional user interface of an example gaming system for implementation on an electronic device.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although the best mode of carrying out the present disclosure has been disclosed, those skilled in the art would recognize that other embodiments for carrying out or practicing the present disclosure are also possible.

Embodiments of the present disclosure provide an electronic device for facilitating a gaming environment. The electronic device includes a display screen and a computing hardware. The computing hardware is operable to execute a software product, which results in generating and rendering a graphical user interface on the display screen. The graphical user interface is configured to facilitate user interactions. The computing hardware, the software product and the graphical user interface are implemented on a gaming system. In an embodiment of the present disclosure, the gaming system includes a war strategy game.

The software product, when executed on the computing hardware, is configured to present a first view of a map on the graphical user interface. The first view of the map displays an enemy territory. The software product, when executed on the computing hardware, is also configured to present one or more user-selectable graphical objects on the graphical user interface. The one or more user-selectable graphical objects may, for example, include one or more troop transportation units.

Additionally, the software product, when executed on the computing hardware, is configured to detect a user's selection of one of the one or more troop transportation units to be deployed to attack the enemy territory, and detect a user's selection of a deploy point on the enemy territory. The software product, when executed on the computing hardware, is configured to execute deployment of the one of the one or more troop transportation units on the enemy territory, upon detection of the user's selections. Consequently, troops emerging from the one of the one or more troop transportation units enter the enemy territory from one or more areas in a proximity of the deploy point.

Apart from the one or more troop transportation units, the one or more user-selectable graphical objects may also include one or more supplemental fires. The one or more supplemental fires may, for example, include one or more weapons, one or more ammunitions, one or more flash fires, and the like. The one or more supplemental fires may be fired from one of the one or more troop transportation units and/or a battle-ship positioned in a sea, for example, to supplement the troops.

The software product, when executed on the computing hardware, is optionally configured to detect a user's selection of one of the one or more supplemental fires to be fired, and detect a user's selection of a fire point on the enemy territory. Accordingly, the software product, when executed on the computing hardware, is optionally configured to execute firing of the one of the one or more supplemental fires on the fire point selected on the enemy territory, upon detection of the user's selections.

In an embodiment of the present disclosure, the one of the one or more supplemental fires is a flash fire that, when fired, re-directs the troops to pass through one or more areas in a proximity of the fire point.

Moreover, the software product, when executed on the computing hardware, is optionally configured to levy a cost of usage of the one of the one or more supplemental fires. Optionally, the cost of usage may be substantially different for each usage of the one of the one or more supplemental fires. In an embodiment of the present disclosure, the cost of usage increases with each usage of the one of the one or more supplemental fires. In another embodiment of the present disclosure, the cost of usage increases after the one of the one or more supplemental fires has been used a predefined number of times.

Moreover, the software product, when executed on the computing hardware, is configured to present a second view of the map on the graphical user interface. The second view of the map displays one or more user-owned territories and one or more enemy territories. Accordingly, the software product, when executed on the computing hardware, is configured to enable a user's selection of one of the one or more enemy territories to be attacked.

The second view of the map optionally includes one or more visible areas and one or more at-least-partially-hidden areas. In such a situation, the software product, when executed on the computing hardware, is optionally configured to present a user-selectable map-resource object on the graphical user interface, detect a user's selection of the user-selectable map-resource object, and present a third view of the map on the graphical user interface. Based at least partially upon the user's selection of the user-selectable map-resource object, at least one of the one or more at-least-partially-hidden areas of the second view of the map is made visible on the third view of the map.

In an example embodiment of the present disclosure, the user-selectable map-resource object includes a radar. Accordingly, the software product, when executed on the computing hardware, is optionally configured to present a user-selectable upgrade option on the graphical user interface, and detect a user's selection of the user-selectable upgrade option. The software product, when executed on the computing hardware, is optionally configured to upgrade the user-selectable map-resource object, based at least partially upon the user's selection of the user-selectable upgrade option. Consequently, the at least one of the one or more at-least-partially-hidden areas is made visible when the user-selectable map-resource object is upgraded.

The software product, when executed on the computing hardware, is optionally configured to levy a cost of usage of the user-selectable map-resource object.

In order to detect user's selections, the electronic device also includes a user input interface rendered over the graphical user interface. The user input interface is configured to detect an input corresponding to moving a pointer object, clicking or tapping the pointer object, or swiping a touch-sensitive object over the graphical user interface.

Moreover, the electronic device optionally includes a database for substantially continuously recording and updating changes in status of the one or more user-selectable graphical objects. The software product, when executed on the computing hardware, is coupled to the database. The software product, when executed on the computing hardware, is optionally configured to resume the status of the one or more user-selectable graphical objects to their last updated status in the database, in case of interruptions in the operable state of the graphical user interface.

In an embodiment of the present disclosure, a plurality of electronic devices are coupled in communication with a server via a communication network. Graphical user interfaces are generated temporally concurrently on display screens of the plurality of electronic devices, to facilitate interactions of a plurality of users with the graphical user interfaces. Beneficially, the graphical user interfaces generated on the plurality of electronic devices are coordinated and synchronized through the server, and updated on the plurality of electronic devices concurrently with time.

Examples of these electronic devices include, but are not limited to, mobile phones, smart telephones, Mobile Internet Devices (MIDs), tablet computers, Ultra-Mobile Personal Computers (UMPCs), phablet computers, Personal Digital Assistants (PDAs), web pads, Personal Computers (PCs), Handheld PCs, laptop computers, desktop computers, Network-Attached Storage (NAS) devices, large-sized touch screens with embedded PCs, and interactive entertainment devices, such as game consoles, Television (TV) sets and Set-Top Boxes (STBs).

Figure 2:
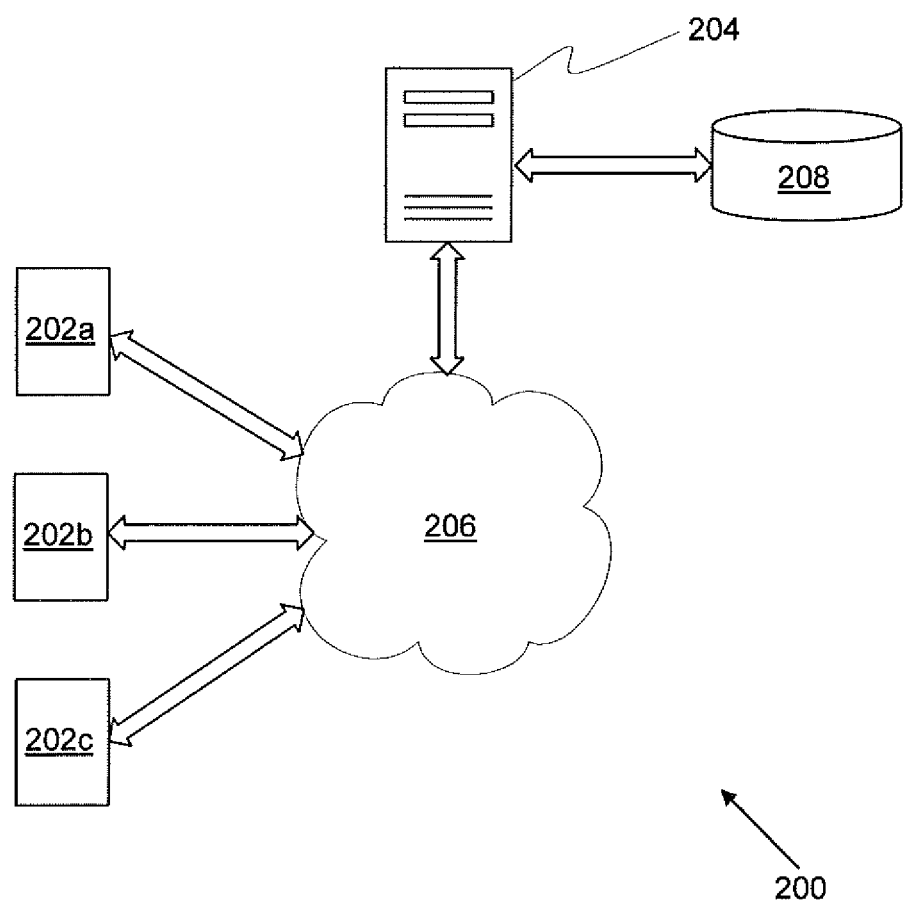
FIG. 2 is a schematic illustration of an example network environment that is suitable for practicing embodiments of the present disclosure.

Referring now to the drawings, particularly by their reference numbers, FIG. 2 is a schematic illustration of an example network environment 200 that is suitable for practicing embodiments of the present disclosure. The network environment 200 includes one or more electronic devices, depicted as an electronic device 202a, an electronic device 202b and an electronic device 202c in FIG. 2 (hereinafter collectively referred to as electronic devices 202). The network environment 200 also includes a server 204 and a communication network 206. The server 204 is coupled to a database 208.

The network environment 200 may be implemented in various ways, depending on various possible scenarios. In one example scenario, the network environment 200 may be implemented by way of a spatially collocated arrangement of the server 204 and the database 208. In another example scenario, the network environment 200 may be implemented by way of a spatially distributed arrangement of the server 204 and the database 208 coupled mutually in communication via the communication network 206. In yet another example scenario, the server 204 and the database 208 may be implemented via cloud computing services.

The electronic devices 202 are coupled in communication with the server 204 via the communication network 206. The communication network 206 can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, and Worldwide Interoperability for Microwave Access (WiMAX) networks.

Additionally or alternatively, the electronic devices 202 may use their own "Bluetooth" network, and connect to a "Bluetooth" server, to synchronize with other electronic devices. ("Bluetooth" is a registered trademark).

Examples of the electronic devices 202 include, but are not limited to, mobile phones, smart telephones, Mobile Internet Devices (MIDs), tablet computers, Ultra-Mobile Personal Computers (UMPCs), phablet computers, Personal Digital Assistants (PDAs), web pads, Personal Computers (PCs), Handheld PCs, laptop computers, desktop computers, Network-Attached Storage (NAS) devices, large-sized touch screens with embedded PCs, and interactive entertainment devices, such as game consoles, Television (TV) sets and Set-Top Boxes (STBs).

The network environment 200 is suitable for operating various gaming systems, simulation systems, or other similar systems. In an embodiment of the present disclosure, the network environment 200 is suitable for operating an online multiplayer gaming system.

In one embodiment, the network environment 200 is used to implement a thin-client game. Accordingly, the gaming system may be arranged in a manner that its functionality is implemented partly in the electronic devices 202 and partly in the server 204.

In another embodiment, the network environment 200 is used to implement a thick-client game. According, the gaming system may be arranged in a manner that its functionality is implemented substantially in the electronic devices 202.

In yet another embodiment, the network environment 200 is used to implement a web-based game. Accordingly, the gaming system may be arranged in a manner that its functionality is implemented substantially in the server 204.

The electronic devices 202 may access the server 204 to download one or more new games or update one or more existing games.

Users associated with the electronic devices 202 play one or more games provided by the gaming system. The gaming system may enable the users to interact and/or share some information with each other.

Additionally, the gaming system may enable some or all of the users to play a game mutually, for example, against each other or as a team. Alternatively, the gaming system may enable the users to play their individual games irrespective of each other.

For illustration purposes, let us consider that a user A is associated with the electronic device 202a, a user B is associated with the electronic device 202b, and a user C is associated with the electronic device 202c. Let us also consider an example situation where the gaming system enables the users A and B to play a game mutually, for example, against each other. Accordingly, graphical user interfaces are generated temporally concurrently on display screens of the electronic devices 202a and 202b, to facilitate interactions of the users A and B with their graphical user interfaces, respectively. In the example situation, the server 204 coordinates and synchronizes the graphical user interfaces generated on the electronic devices 202a and 202b, and updates the graphical user interfaces on the electronic devices 202a and 202b concurrently with time.

Now, let us consider another example situation where the gaming system enables the user C to play a game solitarily. In such a situation, the electronic device 202c need not be coupled to the server 204 substantially continuously, for example, during playing of the game. The electronic device 202c may be coupled to the server 204, for example, when downloading the game from the server. Additionally, the electronic device 202c may be coupled to the server 204 periodically or randomly, for example, to receive updates from the server 204.

Furthermore, the server 204 stores game-related information in the database 208. The game-related information may, for example, include at least one of: accounts of the users, credits of the users, scores of the users, status of games being played by the users, screen-shots of the games, game-related parameters, game views being used by the users, game levels at which the users are playing, versions of the games, and/or associated time-stamps.

Beneficially, the electronic devices 202 and/or the server 204 substantially continuously record and update changes in the status of the games being played by the users in the database 208. The electronic devices 202 are optionally configured to resume the status of the games to their last updated status in the database 208, in case of interruptions in the operable state of the graphical user interfaces.

Optionally, the game-related information, including information about the changes in the status of the games, may be sent to the server 204 in a form of data packages. A data package may typically include a header, a payload and a checksum. The checksum can be a function of the payload. Alternatively, the checksum can be a unique identifier of the user, such as a username being used by the user. Those skilled in the art will understand that an appropriate checksum function or a checksum algorithm may be applied to a plurality of data packages to obtain the checksum, while the game is being played.

In order to avoid possible frauds, the checksum corresponding to a particular data package can be recomputed at any point of time, and compared with the checksum stored with that particular data package. Thus, including the checksum in the data package potentially reduces occurrences of frauds in the game.

FIG. 2 is merely an example, which should not unduly limit the scope of the claims herein. It is to be understood that the specific designation for the network environment 200 is provided as an example and is not to be construed as limiting the network environment 200 to specific numbers, types, or arrangements of electronic devices, servers, communication networks and databases. A person skilled in the art will recognize many variations, alternatives, and modifications of embodiments of the present disclosure.

Figure 3:
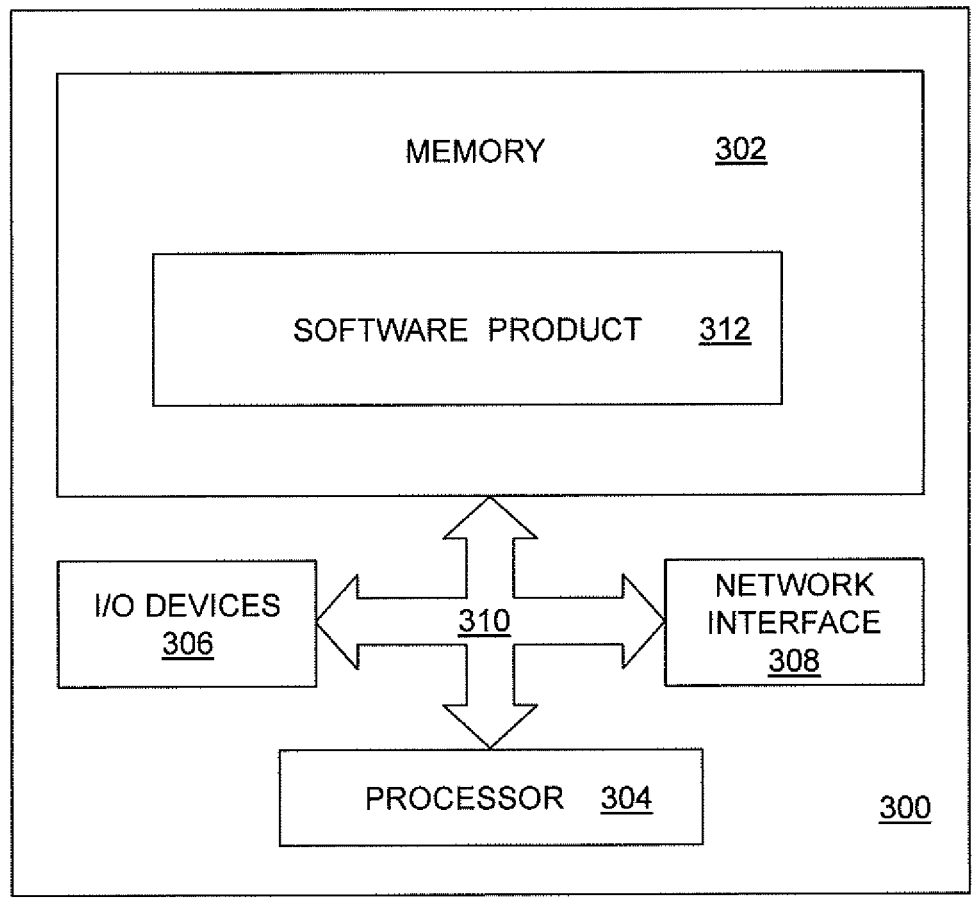
FIG. 3 is a schematic illustration of various components of an electronic device, in accordance with an embodiment of the present disclosure.

FIG. 3 is a schematic illustration of various components of an electronic device 300, in accordance with an embodiment of the present disclosure. The electronic device 300 includes, but is not limited to, a data memory 302, a computing hardware such as a processor 304, Input/Output (I/O) devices 306, a network interface 308, and a system bus 310 that operatively couples various components including the data memory 302, the processor 304, the I/O devices 306 and the network interface 308. The electronic device 300 also includes a power source (not shown in FIG. 3) for supplying electrical power to the various components of the electronic device 300. The power source may, for example, include a rechargeable battery.

The data memory 302 optionally includes non-removable memory, removable memory, or a combination thereof. The non-removable memory, for example, includes Random-Access Memory (RAM), Read-Only Memory (ROM), flash memory, or a hard drive. The removable memory, for example, includes flash memory cards, memory sticks, or smart cards.

The data memory 302 stores a software product 312, while the processor 304 is operable to execute the software product 312. Executing the software product 312 on the processor 304 results in generating and rendering a graphical user interface on the display screen. The graphical user interface is configured to facilitate user interactions.

The computing hardware, the software product 312 and the graphical user interface are optionally implemented on a gaming system. In an embodiment of the present disclosure, the gaming system includes a war strategy game.

Accordingly, the I/O devices 306 facilitate a user input interface rendered over the graphical user interface. The user input interface is optionally configured to detect an input corresponding to moving a pointer object, clicking or tapping the pointer object, or swiping a touch-sensitive object over the graphical user interface.

The I/O devices 306 include a display screen for presenting graphical images to a user of the electronic device 300. Beneficially, the display screen may be a touch-sensitive display screen that is operable to provide the user input interface. The touch-sensitive display screen is operable to receive tactile inputs from the user. These tactile inputs may, for example, include clicking, tapping, pointing, moving, pressing and/or swiping with a finger or a touch-sensitive object like a pen.

The touch-sensitive display screen is optionally configured to sense a pressure applied by the finger or the touch-sensitive object. In one example, the touch-sensitive display screen may be a capacitive touch screen that is operable to detect changes in capacitance. In another example, the touch-sensitive display screen may be a resistive touch screen that is operable to detect changes in resistance. In yet another example, the touch-sensitive display screen is an optical touch screen that is operable to detect changes in reflectivity.

Upon detecting the tactile inputs, the software product 312, when executed on the processor 304, is configured to identify a gesture related to the tactile inputs. The gesture may take into account at least one of: a force applied by the user, a pressure applied by the user, a speed with which the pointer object was moved, a duration for which the gesture was applied, and/or a position on the touch-sensitive display screen where the gesture was applied. Consequently, the software product 312, when executed on the processor 304, is configured to analyse the gesture, and to apply an appropriate action corresponding to the gesture.

Additionally or alternatively, the I/O devices 306 include a mouse, a keyboard or a joystick that is operable to receive inputs corresponding to clicking, pointing, and/or moving a pointer object on the graphical user interface.

Moreover, the I/O devices 306 may also include a speaker for providing an audio output to the user, and a microphone for receiving an audio input from the user.

Optionally, the electronic device 300 includes non-transient data storage arrangements, for example, such as a database (not shown in FIG. 3). The software product 312, when executed on the processor 304, is optionally coupled to the database. The software product 312, when executed on the processor 304, is optionally configured to substantially continuously record and update changes in status of a game being played by the user in the database. The software product 312, when executed on the processor 304, is optionally configured to resume the status of the game to its last updated status in the database, in case of interruptions in the operable state of the graphical user interface.

Additionally, the software product 312, when executed on the processor 304, may store game-related information in the database. The game-related information may, for example, include at least one of: an account of the user, credits of the user, scores of the user, the status of the game, screen-shots of the game, game-related parameters, a game view being used by the user, a game level at which the user is playing, a version of the game, and/or associated timestamps.

Moreover, the network interface 308 optionally allows the electronic device 300 to upload the game-related information to a remote server (not shown in FIG. 3), for example, via a communication network (not shown in FIG. 3). Additionally, the network interface 308 may allow the electronic device 300 to access the remote server to download one or more new games or update one or more existing games.

Moreover, the network interface 308 optionally allows the electronic device 300 to communicate with other electronic devices, for example, via the communication network. The communication network may, for example, be a collection of individual networks, interconnected with each other and functioning as a single large network. Such individual networks may be wired, wireless, or a combination thereof. Examples of such individual networks include, but are not limited to, LANs, WANs, MANs, WLANs, WWANs, WMANs, 2G telecommunication networks, 3G telecommunication networks, 4G telecommunication networks, and WiMAX networks. Additionally or alternatively, the electronic device 300 may also use its own "Bluetooth" network, and connect to a "Bluetooth" server, to synchronize with the other electronic devices.

The electronic device 300 is optionally implemented by way of at least one of: a mobile phone, a smart telephone, an MID, a tablet computer, a UMPC, a phablet computer, a PDA, a web pad, a PC, a Handheld PC, a laptop computer, a desktop computer, an NAS device, a large-sized touch screen with an embedded PC, and an interactive entertainment device, such as a game console, a TV set and an STB.

FIG. 3 is merely an example, which should not unduly limit the scope of the claims herein. It is to be understood that the specific designation for the electronic device 300 is provided as an example and is not to be construed as limiting the electronic device 300 to specific numbers, types, or arrangements of modules and/or components of the electronic device 300. A person skilled in the art will recognize many variations, alternatives, and modifications of embodiments of the present disclosure. For example, the electronic device 300 could be implemented as the electronic devices 202, and vice versa.

FIGS. 4A, 4B, 4C and 4D are illustrations of an example game view 400 of a gaming system, in accordance with an embodiment of the present disclosure. The gaming system may, for example, include a war strategy game in which a user's purpose is to expand his/her territory, for example, by attacking one or more enemy territories. An enemy territory may, for example, be a territory owned by another user or a simulated opponent.

Figure 4A:
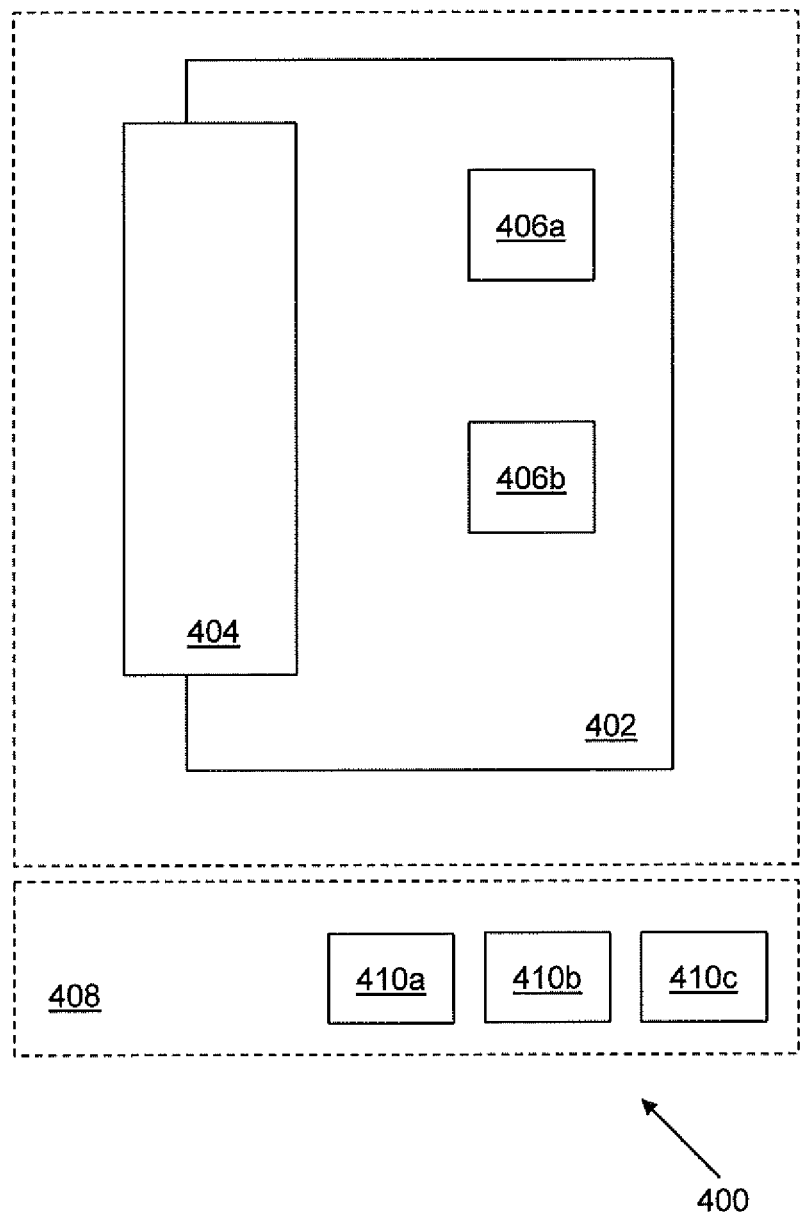
FIGS. 4A, 4B, 4C and 4D are illustrations of an example game view of a gaming system, in accordance with an embodiment of the present disclosure.

For illustration purposes only, let us assume that the gaming system has been implemented on the electronic device 300. The software product 312, when executed on the processor 304, is configured to present the example game view 400 on the graphical user interface generated and rendered on the display screen of the electronic device 300. The example game view 400 may, for example, be a first view of a map that displays an enemy territory being attacked by the user. The enemy territory includes a land region 402 and a shore region 404, as shown in FIG. 4A. A plurality of target objects, depicted as a target object 406a and a target object 406b in FIG. 4A, are positioned in the land region 402. The target objects 406a and 406b may, for example, include headquarters or other defence objects belonging to the enemy territory.

The software product 312, when executed on the processor 304, is also configured to present one or more user-selectable graphical objects on the graphical user interface. The one or more user-selectable graphical objects may be presented within a selection-menu area 408 on the graphical user interface, as shown in FIG. 4A. With reference to FIG. 4A, the selection-menu area 408 has been positioned in a proximity of a periphery of the graphical user interface. In one example, the selection-menu area 408 may be displayed substantially continuously during playing of the game. In another example, the selection-menu area 408 may be displayed as and when required, for example, when the user slides a pointer object towards the periphery of the graphical user interface.

The one or more user-selectable graphical objects include one or more troop transportation units, depicted as a troop transportation unit 410a, a troop transportation unit 410b and a troop transportation unit 410c in FIG. 4 (hereinafter collectively referred to as troop transportation units 410). Examples of the troop transportation units 410 include, but are not limited to, war-ships, war-planes, war-vessels, and war-crafts. Use of the troop transportation units 410 may not be limited to transportation of troops from a user-owned territory to the enemy territory, but may additionally or alternatively include carrying weapons, ammunitions and other supplies for the troops.

The software product 312, when executed on the processor 304, is configured to detect a user's selection of one of the troop transportation units 410 to be deployed to attack the enemy territory, and detect a user's selection of a deploy point on the enemy territory. The software product 312, when executed on the processor 304, is configured to execute deployment of the one of the troop transportation units 410 on the enemy territory, upon detection of the user's selections.

Figure 4B:
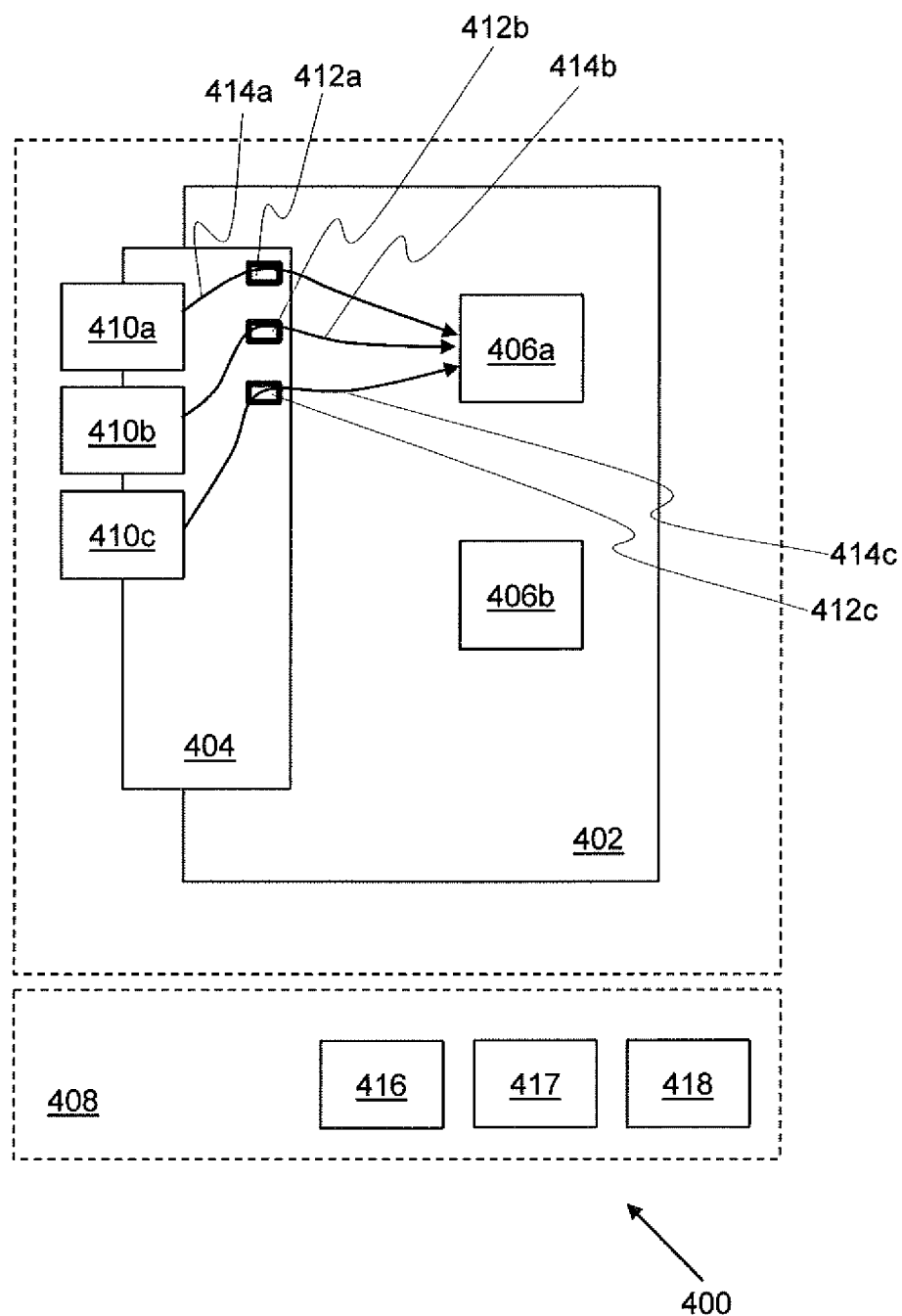

With reference to FIG. 4B, let us consider an example situation where the user selected a first deploy point 412a for deploying the troop transportation unit 410a, a second deploy point 412b for deploying the troop transportation unit 410b and a third deploy point 412c for deploying the troop transportation unit 410c, for example, one after another. As shown in FIG. 4B, the troop transportation units 410a, 410b and 410c are deployed as close to their respective deploy points 412a, 412b and 412c as possible on the shore region 404. Beneficially, the troop transportation units 410a, 410b and 410c are deployed to a free space that is nearest to their respective deploy points 412a, 412b and 412c.

Consequently, troops emerging from the troop transportation units 410a, 410b and 410c enter the enemy territory from one or more areas in proximities of their respective deploy points 412a, 412b and 412c. With reference to FIG. 4B, curved arrows 414a, 414b and 414c depict target routes taken by the troops emerging from the troop transportation units 410a, 410b and 410c, respectively.

Moreover, the software product 312, when executed on the processor 304, may be configured to enable a user's selection of a type of troop to be deployed, for example, by providing one or more troop-type options on the selection-menu area 408.

With reference to FIG. 4B, the troop transportation units 410 have been deployed from the shore region 404. It is to be noted here that the deployment of the troop transportation units 410 is not limited to the shore region 404. Troop transportation units, such as war-planes, may be deployed at any deploy point on the enemy territory.

Moreover, in another example situation, one of the target objects 406a and 406b may be a defence object that applies various defence mechanisms, such as throwing flames or firing ammunitions, against the troops that have entered the enemy territory. In such a situation, the user may choose to supplement the troops, for example, by using one or more supplemental fires.

Accordingly, the one or more user-selectable graphical objects may include one or more supplemental fires. The software product 312, when executed on the processor 304, is optionally configured to detect a user's selection of one of the one or more supplemental fires to be fired, and detect a user's selection of a fire point on the enemy territory. Accordingly, the software product 312, when executed on the processor 304, is optionally configured to execute firing of the one of the one or more supplemental fires on the fire point selected on the enemy territory, upon detection of the user's selections.

The one or more supplemental fires may, for example, include one or more weapons, one or more ammunitions, one or more flash fires, and the like. The one or more supplemental fires may be fired, for example, from one of the troop transportation units 410 and/or a battle-ship positioned in a sea near the shore region 404. With reference to FIG. 4B, the one or more supplemental fires include a weapon 416, an ammunition 417 and a flash fire 418, presented within the selection-menu area 408.

Figure 4C:
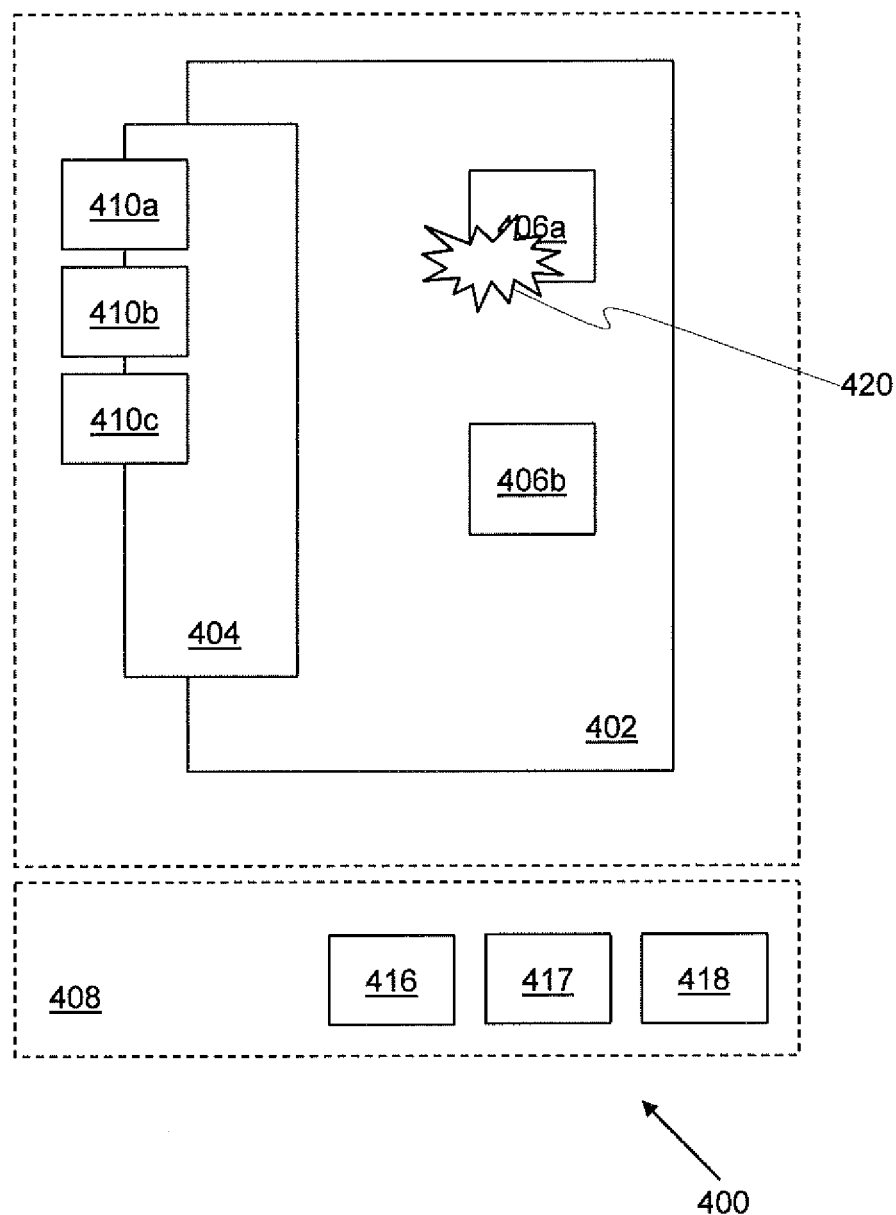

With reference to FIG. 4C, let us assume that the user selected a fire point 420 for firing the ammunition 417. Accordingly, the ammunition 417 is fired at the fire point 420, as shown in FIG. 4C.

Figure 4D:
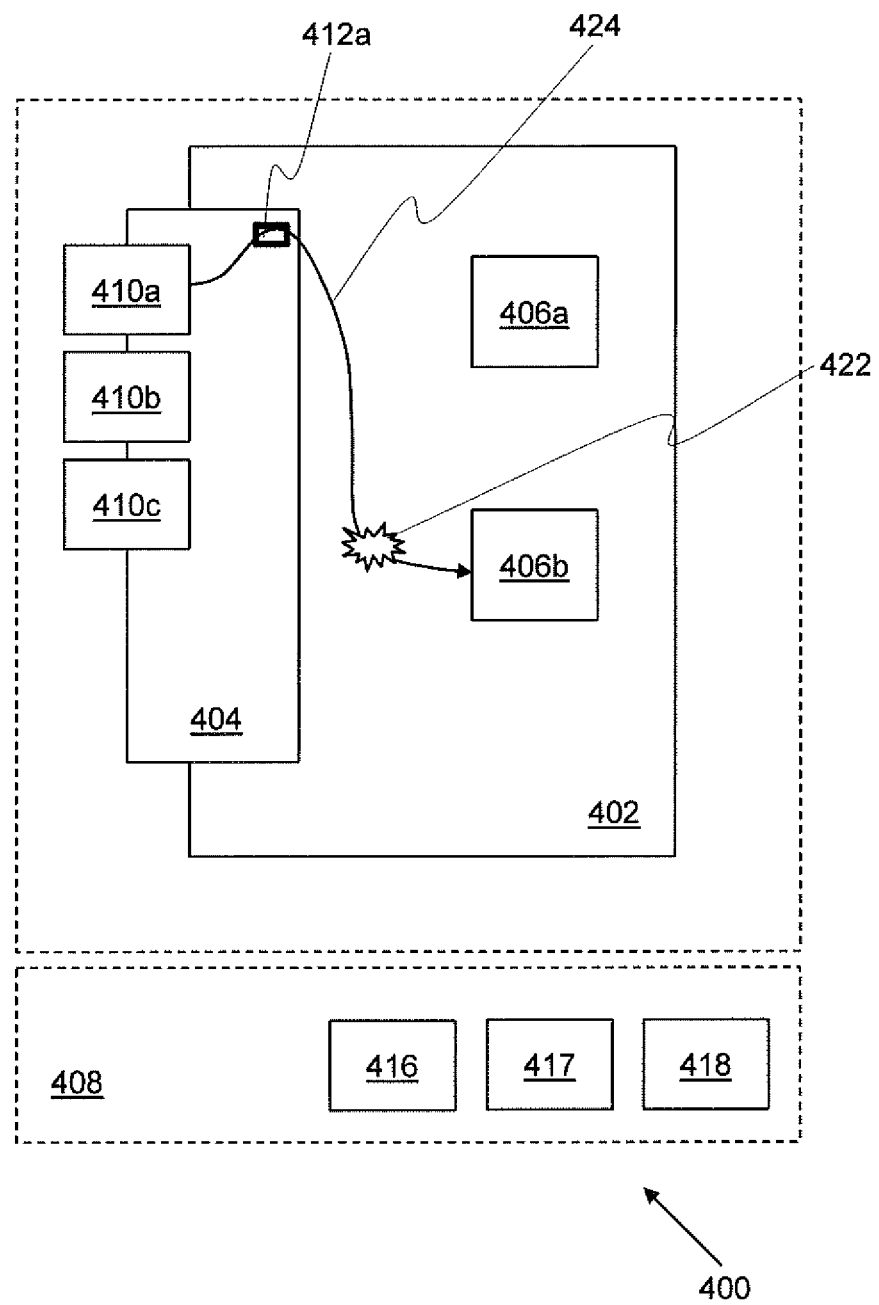

With reference to FIG. 4D, let us assume that the user selected a fire point 422 for firing the flash fire 418. The user may use the flash fire 418 to guide troops that have entered the enemy territory, for example, to enable the troops to reach a desired target object. In an example situation where the target object 106a has been at least partially destroyed, the user may choose to attack the target object 106b.

Accordingly, the flash fire 418 is fired on the fire point 422. Consequently, the flash fire 418 re-directs the troops to pass through one or more areas in a proximity of the fire point 422. Accordingly, the troops that have entered the enemy territory take a target route 424, as shown in FIG. 4D. The target route 424 passes through the areas in the proximity of the fire point 422, and re-directs the troops towards a nearest target object. With reference to FIG. 4D, the target route 424 re-directs the troops towards the target object 406b.

In this manner, the gaming system enables the user to define a war strategy as per his/her desire.

FIGS. 4A, 4B, 4C and 4D are merely examples, which should not unduly limit the scope of the claims herein. A person skilled in the art will recognize many variations, alternatives, and modifications of embodiments of the present disclosure.

Furthermore, the software product 312, when executed on the processor 304, is optionally configured to levy a cost of usage of the one or more supplemental fires. In an embodiment of the present disclosure, the software product 312, when executed on the processor 304, is configured to allocate funds for usage of the one or more supplemental fires. The allocation of the funds may, for example, be based on at least one of: points earned by the user, resources collected by the user, and/or a current score of the user. Accordingly, the software product 312, when executed on the processor 304, is optionally configured to levy the cost of usage from the allocated funds.

Additionally, the software product 312, when executed on the processor 304, may be configured to increase the allocated funds during playing of the game. In one example, the allocated funds may be increased when the user destroys one of the target objects 406a and 406b.

Optionally, the cost of usage may be substantially different for each usage of a particular supplemental fire. In an embodiment of the present disclosure, the cost of usage increases with each usage of the particular supplemental fire. In another embodiment of the present disclosure, the cost of usage increases after the particular supplemental fire has been used a predefined number of times.

In order to illustrate how the cost of usage may be varied, let us consider an example table in which costs of usage of example supplemental fires have been provided. The costs have been provided in arbitrary units.

| Supplemental Fire | First Usage | Second Usage | Third Usage | $N^{th}$ Usage |
|---|---|---|---|---|
| F1 | 2 | 4 | 8 | $2^N$ |
| F2 | 1 | 2 | 3 | N |
| F3 | 10 | 5 | 3.33 | 10/N |
| F4 | 1 | 1.1 | 1.2 | 1 + (N − 1)/10 |
| F5 | 1 | 4 | 3 | Random |

The column 'First Usage' provides a cost of a first usage of a particular supplemental fire. The column 'Second Usage' provides a cost of a second usage of the particular supplemental fire. The column 'Third Usage' provides a cost of a third usage of the particular supplemental fire. The column '$N^{th}$ Usage' provides a cost of an $N^{th}$ usage of the particular supplemental fire, where N is any positive integer.

The supplemental fires 'F1', 'F2', 'F3', 'F4' and 'F5' may, for example, include one or more weapons, one or more ammunitions, one or more flash fires, and the like.

It can be seen from the example table that the cost of usage increases with each usage of the supplemental fires 'F1', 'F2' and 'F4'. This potentially encourages the user to use the allocated funds for different supplemental fires, and not use a particular supplemental fire repeatedly.

In other scenarios, it can be seen from the example table that the cost of usage decreases with each usage of the supplemental fire 'F3', while the cost of usage is randomly chosen for each usage of the supplemental fire 'F5'. This may provide an element of surprise for the user, and make user's experience of playing the game even more enjoyable.

Let us consider an example scenario in which the software product 312, when executed on the processor 304, has allocated '6 units' as funds for usage of the supplemental fires 'F1', 'F2' and 'F5'. In order to optimize utilization of the allocated funds, the user may optimally choose to fire the supplemental fire 'F1' once, the supplemental fire 'F2' twice, and the supplemental fire 'F5' once. From the example table, it can be seen that:

the cost of a first usage of the supplemental fire 'F1'=2 units the cost of a first usage of the supplemental fire 'F2'=1 unit the cost of a second usage of the supplemental fire 'F2'=2 units the cost of first usage of the supplemental fire 'F5'=1 unit Therefore, the total cost of usage=2+1+2+1=6 units In this manner, increase in the cost of usage potentially encourages the user to use the allocated funds for different supplemental fires, and not use a particular supplemental fire repeatedly. This facilitates optimal usage of the supplemental fires.

Costs of usages provided in the example table are merely examples, which should not unduly limit the scope of the claims herein. A person skilled in the art will recognize many variations, alternatives, and modifications of embodiments of the present disclosure.

Figure 5:
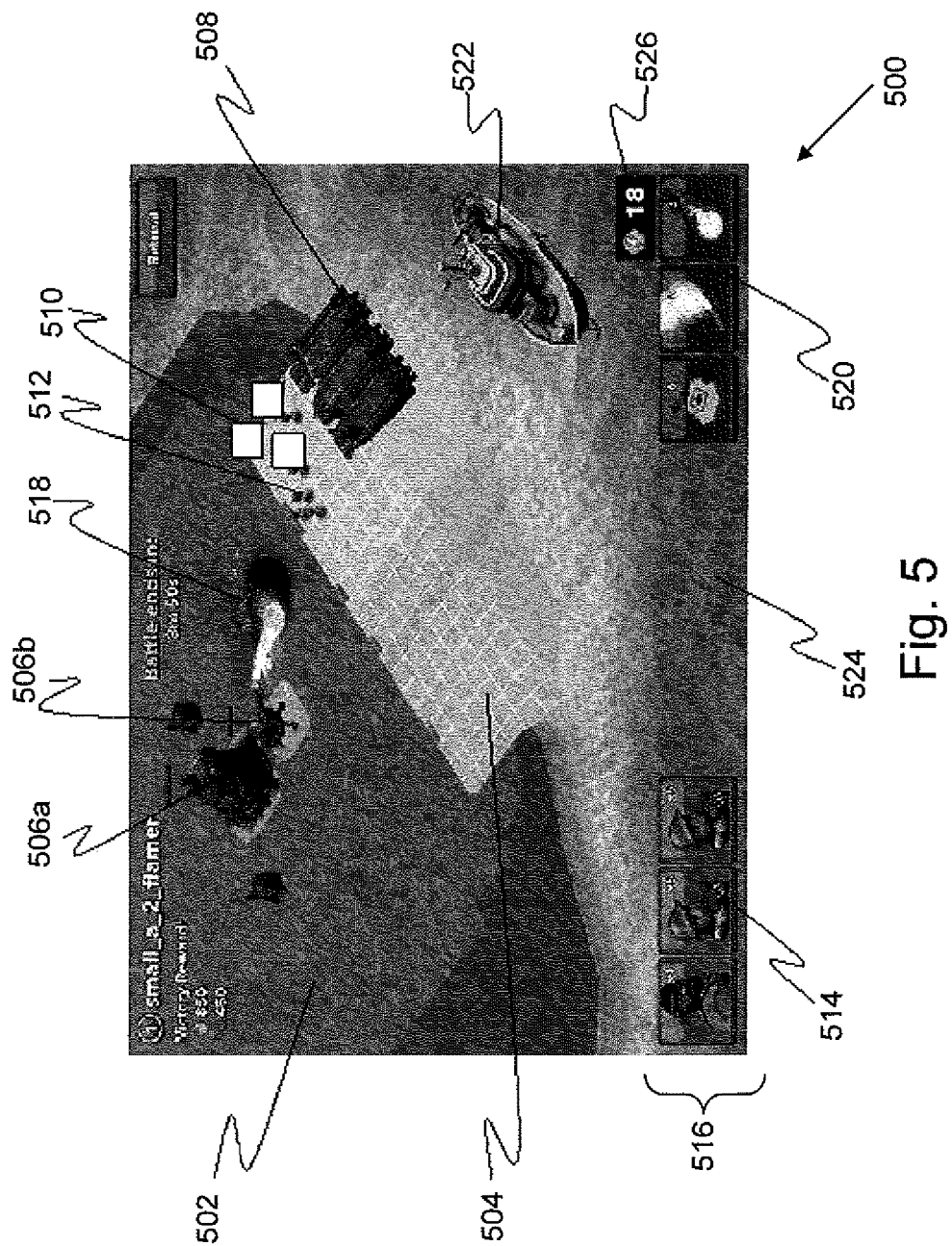
FIG. 5 is an illustration of an example screenshot of a game view of the gaming system, in accordance with an embodiment of the present disclosure.

FIG. 5 is an illustration of an example screenshot of a game view 500 of the gaming system, in accordance with an embodiment of the present disclosure. The game view 500 may, for example, be a first view of a map that displays an enemy territory being attacked by the user. The enemy territory includes a land region 502 and a shore region 504, as shown in FIG. 5. Target objects 506a and 506b are positioned in the land region 502. In an example, the target objects 506a and 506b may be a head-quarter and a defence tower, respectively, belonging to the enemy territory.

Troop transportation units 508 are deployed as close to their respective deploy points 510 as possible on the shore region 504. Consequently, troops 512 emerging from the troop transportation units 508 enter the enemy territory from one or more areas in proximities of their respective deploy points 510.

Moreover, the user may select a type of troop to be deployed, for example, by selecting one or more troop-type options 514 provided on a selection-menu area 516.

In an example situation where the target object 506b throws flames 518 on the troops 512, the user may choose to supplement the troops 512, for example, by using supplemental fires 520 provided on the selection-menu area 516. The supplemental fires 520 may, for example, include one or more weapons, one or more ammunitions, one or more flash fires, and the like. The supplemental fires 520 may be fired, for example, from one of the troop transportation units 508 and/or a battle-ship 522 positioned in a sea 524.

In the game view 500, funds 526 have been allocated for usage of various resources, such as the supplemental fires 520. When a particular supplemental fire is fired, the cost of usage of that particular supplemental fire is levied from the funds 526.

FIG. 5 is merely an example, which should not unduly limit the scope of the claims herein. A person skilled in the art will recognize many variations, alternatives, and modifications of embodiments of the present disclosure.

Figure 6:
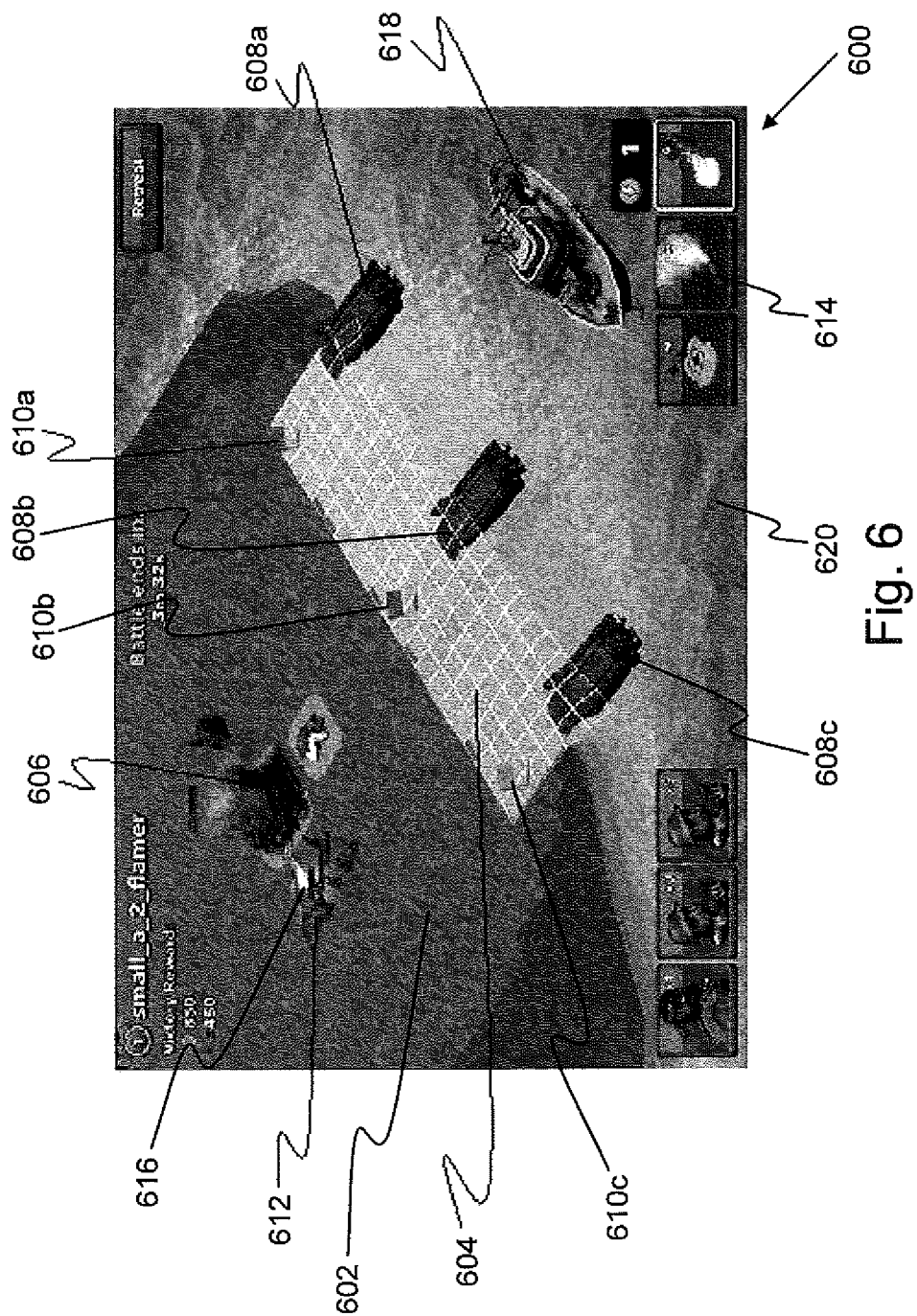
FIG. 6 is an illustration of another example screenshot of the game view of the gaming system, in accordance with an embodiment of the present disclosure.

FIG. 6 is an illustration of an example screenshot of a game view 600 of the gaming system, in accordance with an embodiment of the present disclosure. The game view 600 may, for example, be a first view of a map that displays an enemy territory being attacked by the user. The enemy territory includes a land region 602 and a shore region 604, as shown in FIG. 6. A target object 606 is positioned in the land region 602. In an example, the target object 606 may be a head-quarter belonging to the enemy territory.

Troop transportation units 608a, 608b and 608c are deployed to a free space that is nearest to their respective deploy points 610a, 610b and 610c. Consequently, troops 612 emerging from the troop transportation units 608a, 608b and 608c enter the enemy territory from one or more areas in proximities of their respective deploy points 610a, 610b and 610c.

With reference to FIG. 6, the troops 612 are attacking the target object 606 from a particular location beside the target object 606. In order to guide the troops 612 to reach that particular location, the user selects a flash fire 614 to be fired at a fire point 616. The flash fire 614 may, for example, be fired from a battle-ship 618 positioned in a sea 620.

FIG. 6 is merely an example, which should not unduly limit the scope of the claims herein. A person skilled in the art will recognize many variations, alternatives, and modifications of embodiments of the present disclosure.

Figure 7:
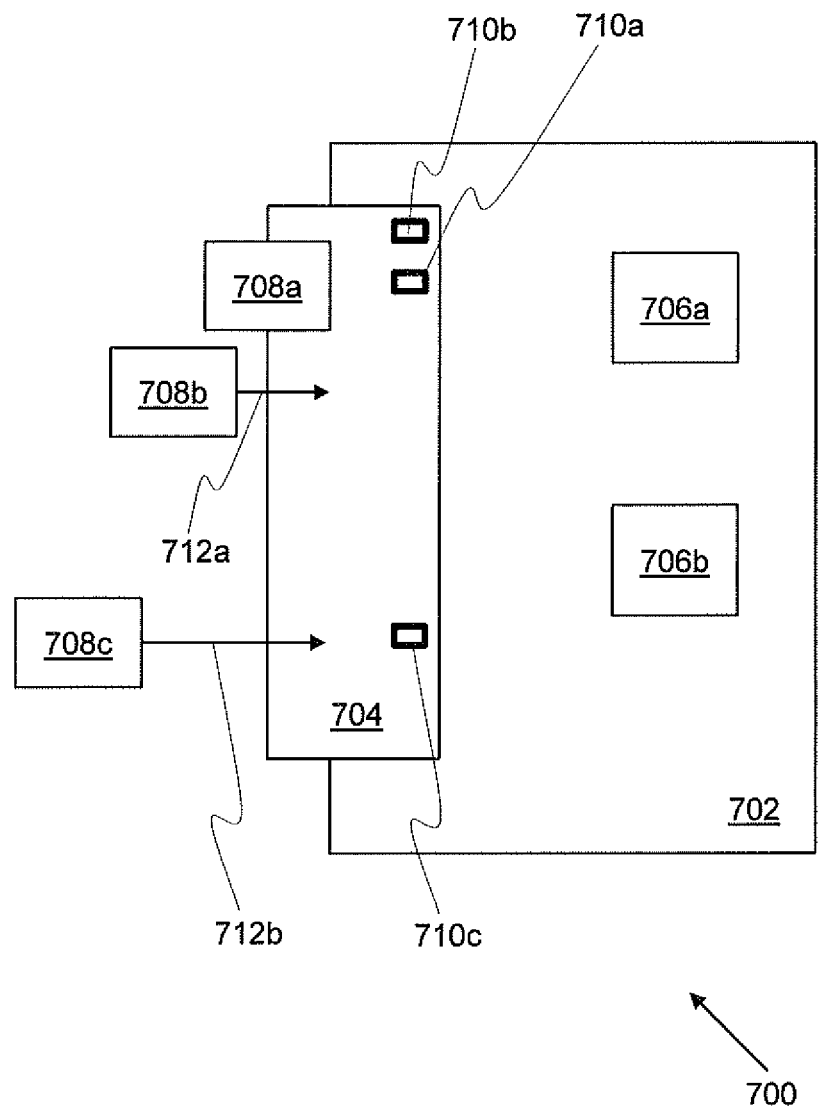
FIG. 7 is an illustration of an example game view of the gaming system, in accordance with an embodiment of the present disclosure.

FIG. 7 is an illustration of an example game view 700 of the gaming system, in accordance with an embodiment of the present disclosure. The example game view 700 may, for example, be a first view of a map that displays an enemy territory being attacked by the user. The enemy territory includes a land region 702 and a shore region 704, as shown in FIG. 7. A plurality of target objects, depicted as a target object 706a and a target object 706b in FIG. 7, are positioned in the land region 702.

Let us consider an example scenario in which the user chose to deploy a troop transportation unit 708a at a deploy point 710a first. As shown in FIG. 7, the troop transportation unit 708a is deployed to a free space that is nearest to its respective deploy point 710a. Consequently, troops emerging from the troop transportation unit 708a enter the enemy territory from one or more areas in a proximity of the deploy point 710a, for example, to attack the target object 706a.

In the example scenario, the user next chooses to deploy a troop transportation unit 708b at a deploy point 710b that is positioned above the deploy point 710a on the shore region 704. With reference to FIG. 7, no free space is available on the shore region 704 above the troop transportation unit 708a. Consequently, the troop transportation unit 708b is being deployed at a free space below the troop transportation unit 708a that is nearest to its respective deploy point 710b, as depicted by an arrow 712a.

Troops emerging from the troop transportation unit 708b enter the enemy territory from one or more areas in a proximity of the deploy point 710b, irrespective of a location at which the troop transportation unit 708b is deployed. In this manner, the gaming system enables the user to control deployment of the troops, thereby enabling the user to define a war strategy as per his/her desire.

Furthermore, in the example scenario, the user chooses to deploy a troop transportation unit 708c at a deploy point 710c. With reference to FIG. 7, sufficient free space is available on the shore region 704. Consequently, the troop transportation unit 708c is being deployed to a free space that is nearest to its respective deploy point 710c, as depicted by an arrow 712b.

FIG. 7 is merely an example, which should not unduly limit the scope of the claims herein. A person skilled in the art will recognize many variations, alternatives, and modifications of embodiments of the present disclosure.

Figure 8A:
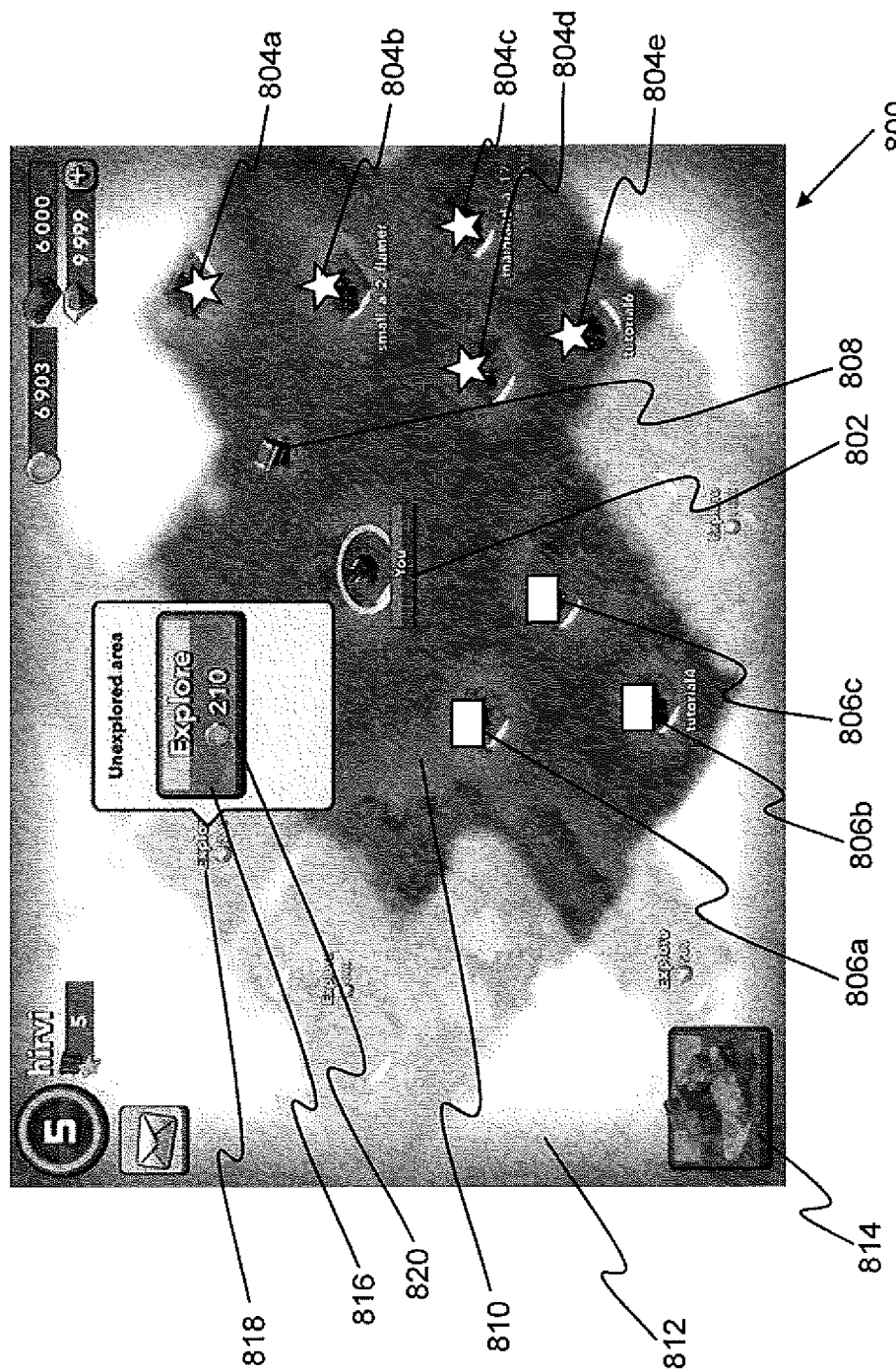
FIGS. 8A, 8B and 8C are illustrations of another example game view of the gaming system, in accordance with an embodiment of the present disclosure.
Figure 8B:
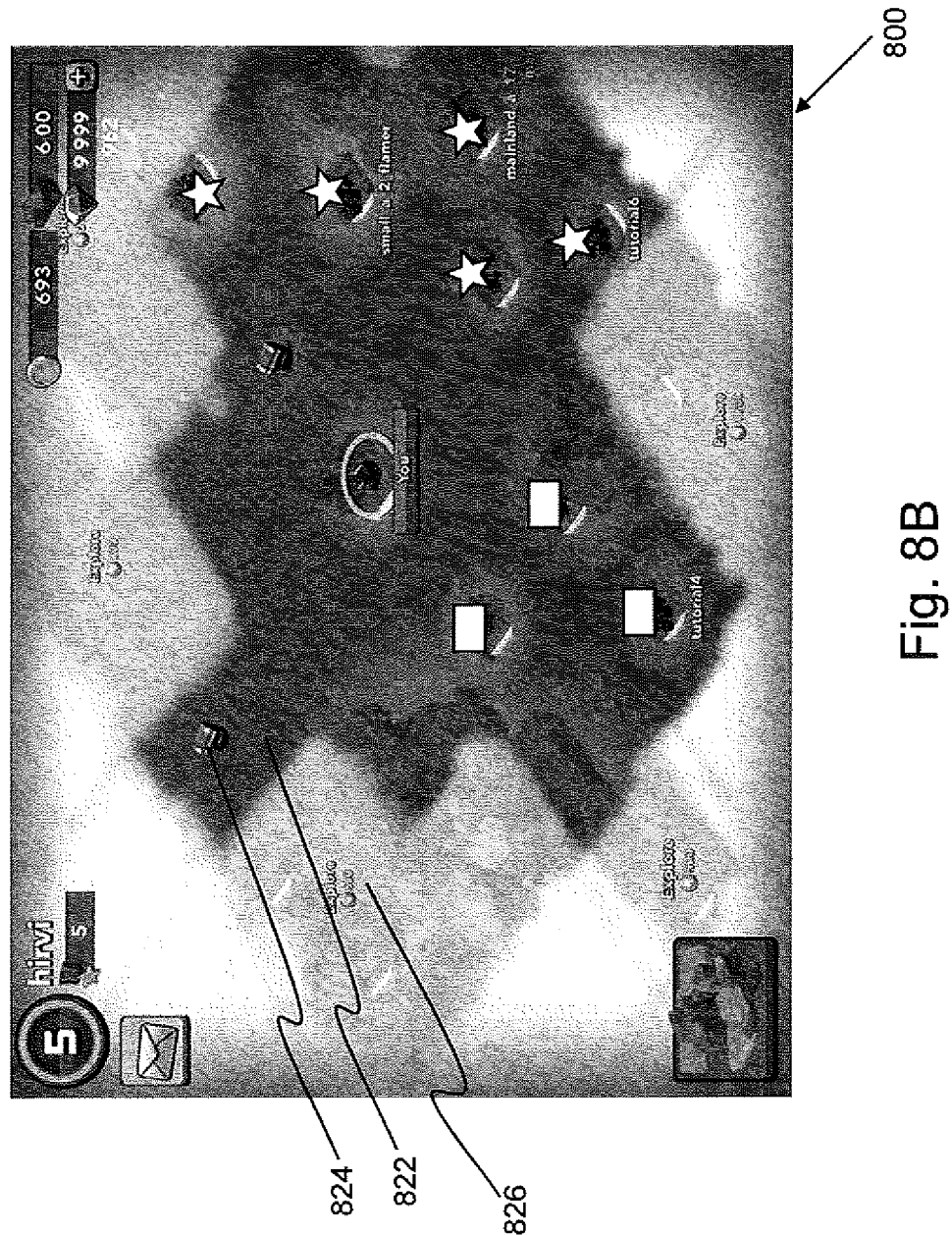
Figure 8C:
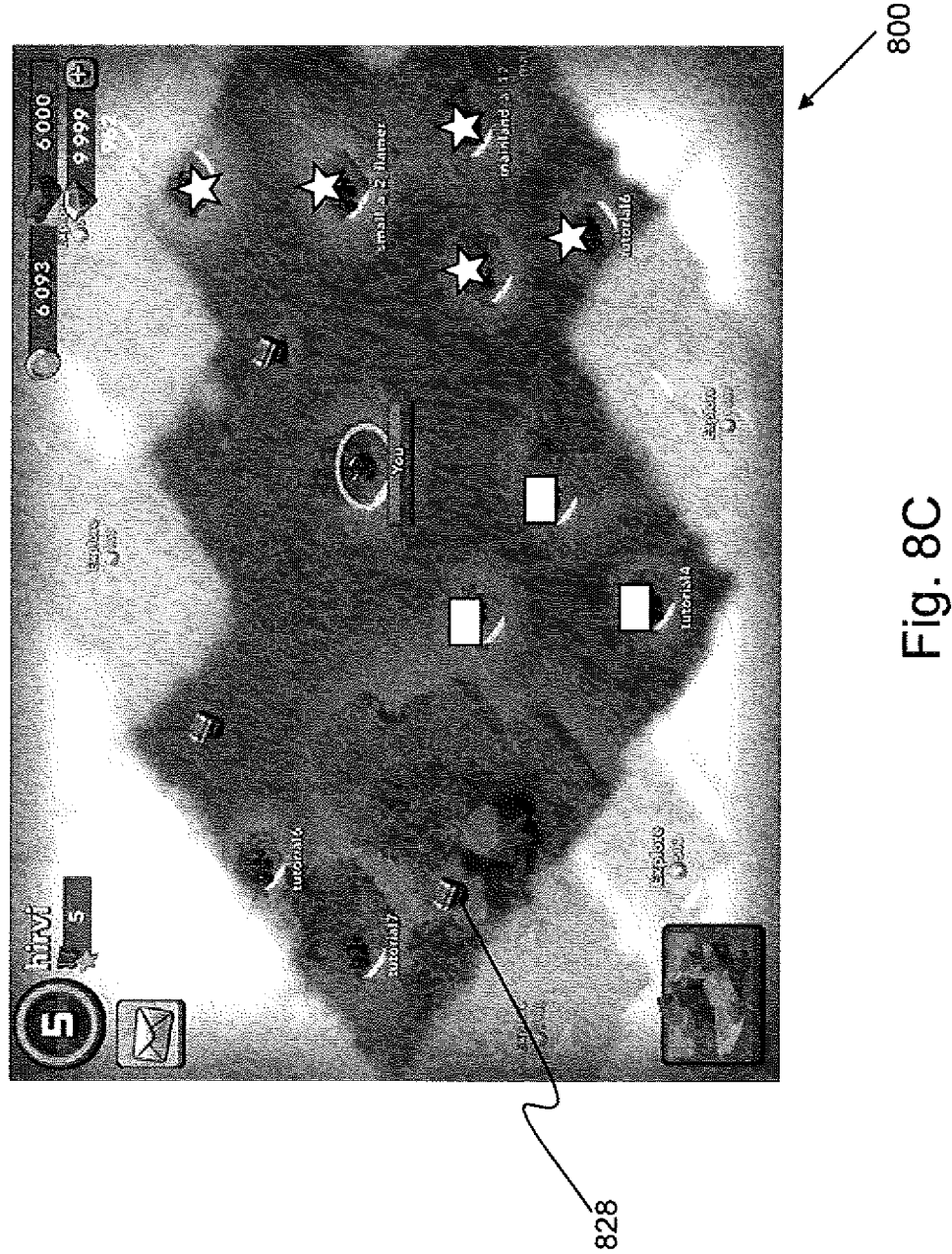

FIGS. 8A, 8B and 8C are illustrations of an example game view 800 of the gaming system, in accordance with an embodiment of the present disclosure. As described earlier, the gaming system may include a war strategy game in which the user's purpose is to expand his/her territory, for example, by attacking one or more enemy territories. An enemy territory may, for example, be a territory owned by another user or a simulated opponent.

For illustration purposes only, let us assume that the gaming system has been implemented on the electronic device 300. The software product 312, when executed on the processor 304, is configured to present the example game view 800 on the graphical user interface generated and rendered on the display screen of the electronic device 300. The example game view 800 includes a second view of the map depicted in FIG. 8A, a third view of the map depicted in FIG. 8B, and a fourth view of the map depicted in FIG. 8C.

With reference to FIG. 8A, the second view of the map displays one or more user-owned territories, depicted as a user-owned territory 802; one or more enemy territories, depicted as enemy territories 804a, 804b, 804c, 804d and 804e (hereinafter collectively referred to as enemy territories 804); and one or more friend territories, depicted as friend territories 806a, 806b and 806c (hereinafter collectively referred to as friend territories 806). A friend territory may, for example, be a territory that may have been freed from an enemy. Additionally, the second view of the map displays one or more treasures, depicted as a treasure 808.

With reference to FIG. 8A, the user-owned territory 802 is located in a middle portion of the second view of the map, for example, by default. The software product 312, when executed on the processor 304, may be configured to allow the user to slide the second view of the map in all the directions, zoom-in to and zoom-out from the second view of the map, and so on.

The second view of the map includes one or more visible areas, depicted as a visible area 810, and one or more at-least-partially-hidden areas, depicted as at-least-partially-hidden areas 812. The user-owned territory 802, the enemy territories 804, the friend territories 806 and the treasure 808 are located within the visible area 810, and therefore, are visible to the user.

The software product 312, when executed on the processor 304, is optionally configured to present a user-selectable map-resource object 814 on the graphical user interface, and detect a user's selection of the user-selectable map-resource object 814. Consequently, the software product 312, when executed on the processor 304, is optionally configured to present a user-selectable upgrade option 816 on the graphical user interface, detect a user's selection of the user-selectable upgrade option 816, and upgrade the user-selectable map-resource object 814, based at least partially upon the user's selection of the user-selectable upgrade option 816.

In an example embodiment of the present disclosure, the user-selectable map-resource object 814 includes a radar. Consequently, the software product 312, when executed on the processor 304, is configured to present a third view of the map on the graphical user interface, as shown in FIG. 8B. Based at least partially upon the user's selection of the user-selectable map-resource object 814, at least one of the at-least-partially-hidden areas 812 of the second view of the map is made visible on the third view of the map. Beneficially, the at least one of the at-least-partially-hidden areas 812 is made visible when the user-selectable map-resource object 814 is upgraded. In this manner, the user may upgrade the user-selectable map-resource object 814 to explore unexplored areas.

With respect to FIGS. 8A and 8B, an at-least-partially-hidden area 818 on the second view of the map is made visible, and is shown as a visible area 822 on the third view of the map. As a result, a treasure 824 located within the visible area 822 is now visible to the user.

Moreover, the software product 312, when executed on the processor 304, is optionally configured to levy a cost of usage of the user-selectable map-resource object 814. The cost of usage of the user-selectable map-resource object 814 may be different for different at-least-partially-hidden areas. With reference to FIG. 8A, the cost of usage of the user-selectable map-resource object 814 for the at-least-partially-hidden area 818 is displayed as a cost 820 beside the user-selectable upgrade option 816. The cost of usage may be provided in any arbitrary units, and may be levied with respect to various resources, such as gold, gems, wood and stones, collected by the user.

With respect to FIG. 8B, the user may next choose to make an at-least-partially-hidden area 826 visible, for example, by upgrading the user-selectable map-resource object 814 again. With reference to FIG. 8C, the at-least-partially-hidden area 826 on the third view of the map is shown as a visible area 828 on the fourth view of the map. Consequently, the visible area 828 is now visible to the user.

Moreover, in an example situation where some or all of the enemy territories 804 are owned by other users, the other users may be selected randomly, for example, when the second view of the map is opened. Alternatively, the other users may be selected by the user him/herself. Yet alternatively, the user may invite other players to join the game, for example, using the network interface 308 of the electronic device 300.

Beneficially, selection of the other users may be dependent on a game level at which the user is playing the game. Accordingly, users playing at substantially similar game levels may be selected to play together with the user.

Furthermore, the software product 312, when executed on the processor 304, is optionally configured to enable a user's selection of one of the enemy territories 804 to be attacked. The one of the enemy territories 804 selected by the user may then be displayed in a manner that is similar to the first view of the map as illustrated in FIGS. 5 and 6.

In a situation where the user attacks the one of the enemy territories 804 and defeats the one of the enemy territories 804, the user receives resources that were previously in possession of the one of the enemy territories 804. The resources may, for example, include gold, gems, wood, stones, food, and so on. Accordingly, the software product 312, when executed on the processor 304, is optionally configured to transfer to the user the resources that were previously in possession of the one of the enemy territories 804, when the user defeats the one of the enemy territories 804.

In accordance with an embodiment of the present disclosure, the user receives the resources that were previously in possession of the one of the enemy territories 804 at a time when the resources of the one of the enemy territories 804 were first revealed to the user. The resources of the one of the enemy territories 804 may, for example, be revealed to the user when the user opens the first view of the map corresponding to the one of the enemy territories 804.

For illustration purposes only, let us consider an example scenario as described below:

1) At a time 't1', a particular enemy territory has 150 units of a particular resource, such as gold, in possession. Let us assume that the particular enemy territory is owned by an opponent user.

2) The user chooses to open the first view of the map corresponding to the particular enemy territory, for example, to attack or visit the particular enemy territory at the time 't1' or a time that is substantially close to the time 't1', and finds that the particular enemy territory has 150 units of the particular resource in possession.

3) The user subsequently chooses to attack the particular enemy territory at the time 't1' or the time that is substantially close to the time 't1'. Let us assume that the user does not win a battle against the particular enemy territory. Accordingly, the particular resource may not be transferred to the user. Alternatively, the particular resource may be transferred only partially to the user.

4) Over a period of time, for example, at a time 't2', the particular enemy territory earns and/or gathers more units of the particular resource, say 3000 units of the particular resource.

5) The user chooses to attack the particular enemy territory again, for example, at the time 't2' or a time that is substantially close to the time 't2'. The user sees that the particular enemy territory has 150 units of the particular resource in possession, i.e., an amount of the particular resource that was revealed to the user at the time 't1' or the time that is substantially close to the time 't1'. Let us assume that the user wins the battle and defeats the opponent user. Accordingly, 150 units of the particular resource are transferred to the user.

6) As the opponent user lost the battle, the opponent user loses 3000 units of the particular resource, i.e., 100% of the particular resource he/she had in possession at the time 't2'.

In this manner, the gaming system ensures that the user receives the amount of the particular resource that was first revealed to the user, as the user saw the amount as an opportunity when the user attacked again. The gaming system also ensures that the opponent user loses 100% of the particular resource he/she had in possession, as it would not be fair if the opponent user loses only 150 units from 3000 units of the particular resource even after losing the battle. This potentially leads to optimal distribution of resources, and facilitates a balance in an economic system between the user and the opponent user.

Furthermore, the user can receive additional resources from one or more of the friend territories 806 that were freed from an enemy, for example, as a reward for freeing the one or more of the friend territories 806. Accordingly, the software product 312, when executed on the processor 304, is optionally configured to transfer to the user the additional resources from the one or more of the friend territories 806. Beneficially, the additional resources may be transferred on a periodic basis. For example, a particular friend territory may transfer 10 units of a resource per hour to the user.

FIGS. 8A, 8B and 8C are merely examples, which should not unduly limit the scope of the claims herein. A person skilled in the art will recognize many variations, alternatives, and modifications of embodiments of the present disclosure.

Figure 9:
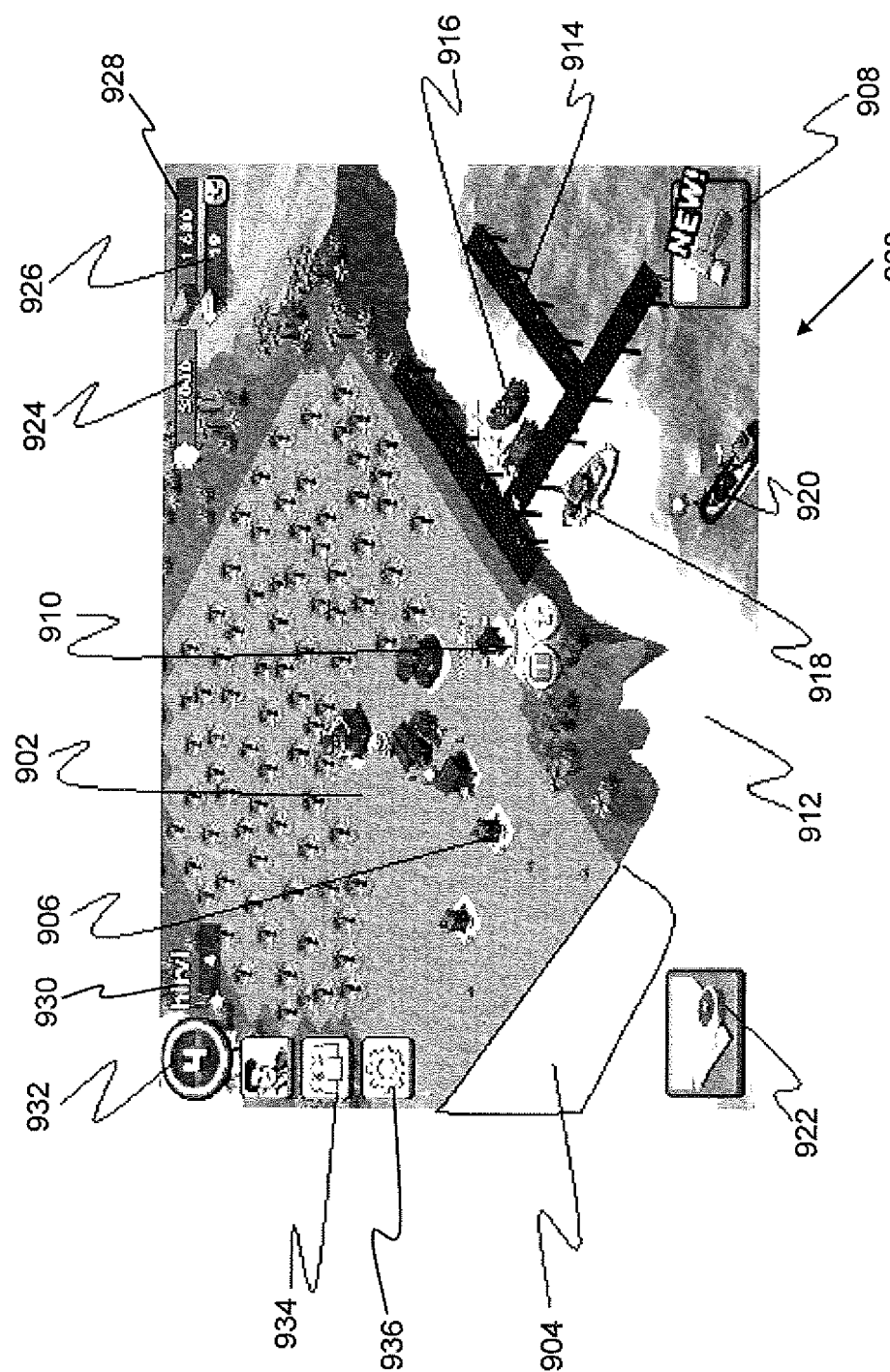
FIG. 9 is an illustration of yet another example game view of the gaming system, in accordance with an embodiment of the present disclosure.

FIG. 9 is an illustration of an example game view 900 of the gaming system, in accordance with an embodiment of the present disclosure. The example game view 900 displays a home base of the user. The home base of the user includes a land region 902 and a shore region 904.

One or more user-selectable graphical objects, depicted as user-selectable graphical objects 906, are positioned in the land region 902. In an example, the user-selectable graphical objects 906 may include a head-quarter, one or more defence towers and other supporting structures.

The user can create, build, move, update or upgrade the user-selectable graphical objects 906. In one example, the user can use a new option 908 to create new user-selectable graphical objects.

With reference to FIG. 9, one or more user-selectable options 910 are presented to the user, for example, when the user selects one of the user-selectable graphical objects 906. The user-selectable options 910 may, for example, include an upgrade option that, when selected, upgrades the one of the user-selectable graphical objects 906 from its current level to a higher level. Additionally, the user-selectable options 910 may include an information option that, when selected, provides the user with information related to the one of the user-selectable graphical objects 906.

Optionally, one or more landscape objects, such as trees and cliffs, are displayed in the example game view 900, for example, corresponding to a landscape view selected by the user.

With reference to FIG. 9, an enemy can enter from the shore region 904 to attack the home base of the user. The shore region 904 is beside a sea 912 that surrounds the home base of the user.

A dock structure 914 is built in the sea 912. The dock structure 914 provides a free space for docking troop transportation units 916, a battle-ship 918, and a cargo-ship 920. The cargo-ship 920 may, for example, deliver supplies to and from the home base of the user.

Additionally, the user can use the new option 908 to create new troop-transportation units and battle-ships. It is to be noted here that the free space of the dock structure 914 can be limited or unlimited, for example, depending on a game configuration being used.

Moreover, the user can access other game views from the example game view 900. In one example, the user can access a map to select an enemy territory to be attacked. The map may be accessed, for example, using a map-view option 922.

Typically, there are certain resources in possession of the user. Available resources are beneficially displayed to the user. With reference to FIG. 9, the resources include gold units 924, gems 926 and wood 928.

The user can use some of these resources for various purposes. In one example, the user can use his/her resources to create or build certain user-selectable graphical objects, such as defence towers, troop transportation units, battle-ships and so on. In another example, the user can use his/her resources to upgrade a user-selectable graphical object or a game level itself.

Information about an amount of these resources in possession of the user is optionally updated to a remote server, such as the server 204. Beneficially, the information may be updated substantially continuously. Alternatively, the information may be updated periodically.

Moreover, the gaming system may allow the user to receive additional resources by making actual financial payments to the gaming system. Such financial payments may, for example, be made using a payment arrangement that is coupled in communication with the remote server.

Moreover, the example game view 900 also displays users' name 930 and a current score 932 of the user.

Additionally, the example game view 900 also displays a forum option 934, and a trouble-shooting option 936. When selected by the user, the forum option 934 initiates a discussion forum with other users, while the trouble-shooting option 936 provides information that helps the user to trouble-shoot problems that he/she may have encountered.

FIG. 9 is merely an example, which should not unduly limit the scope of the claims herein. A person skilled in the art will recognize many variations, alternatives, and modifications of embodiments of the present disclosure.

Figure 10:
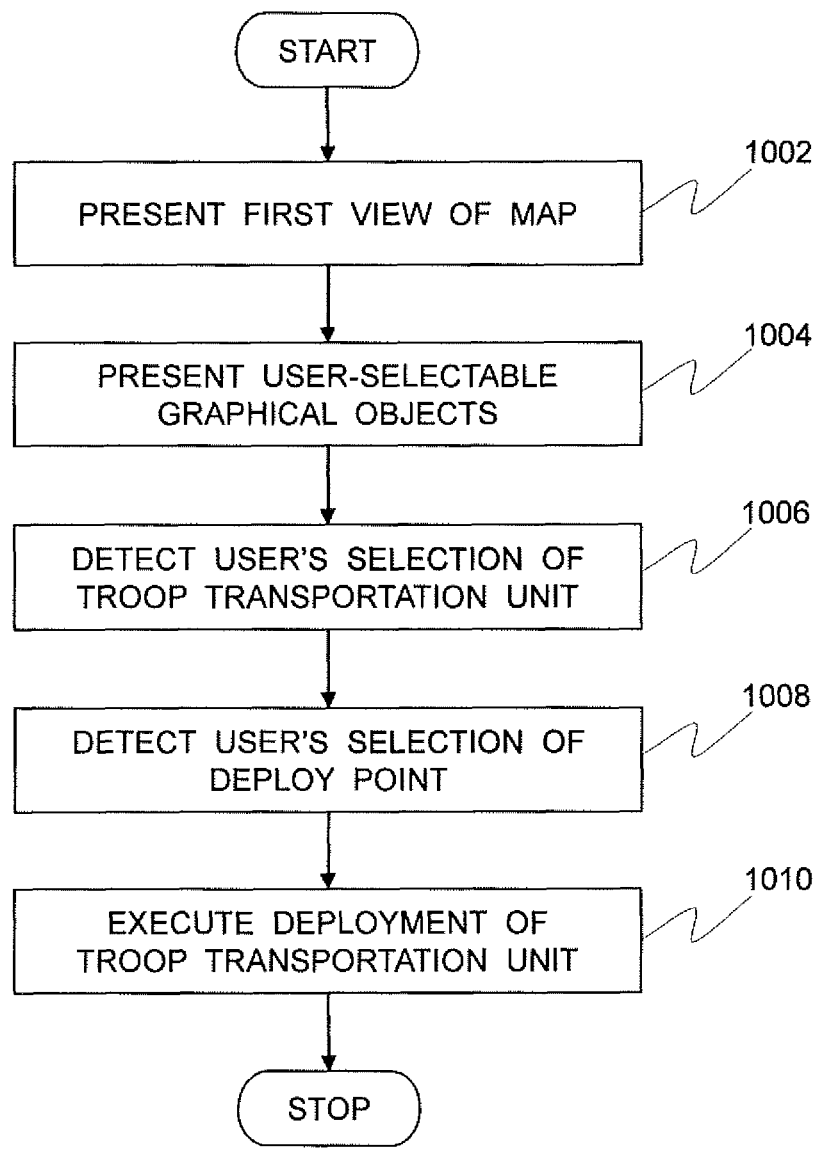
FIG. 10 is an illustration of steps of a method of facilitating user interactions with a graphical user interface, in accordance with an embodiment of the present disclosure.

FIG. 10 is an illustration of steps of a method of facilitating user interactions with a graphical user interface, in accordance with an embodiment of the present disclosure. The method is depicted as a collection of steps in a logical flow diagram, which represents a sequence of steps that can be implemented in hardware, software, or a combination thereof.

As described earlier, the graphical user interface is generated and rendered on a display screen of an electronic device, by executing a software product on a computing hardware of the electronic device. The electronic device may, for example, be implemented in a manner that is similar to the implementation of the electronic device 300 and/or the electronic devices 202.

At a step 1002, a first view of a map is presented on the graphical user interface. The first view of the map displays an enemy territory.

At a step 1004, one or more user-selectable graphical objects are presented on the graphical user interface. The one or more user-selectable graphical objects include one or more troop transportation units.

The steps 1002 and 1004 may be performed simultaneously.

At a step 1006, a user's selection of one of the one or more troop transportation units is detected. In accordance with the step 1006, the one of the one or more troop transportation units is selected to be deployed to attack the enemy territory.

At a step 1008, a user's selection of a deploy point on the enemy territory is detected.

At a step 1010, deployment of the one of the one or more troop transportation units on the enemy territory is executed. Consequently, troops emerging from the one of the one or more troop transportation units enter the enemy territory from one or more areas in a proximity of the deploy point.

Optionally, the method may include additional steps at which a user's selection of a supplemental fire to be fired and a fire point on the enemy territory are detected; and consequently, firing of the supplemental fire is executed on the fire point selected on the enemy territory. In an example situation where the supplemental fire is a flash fire, the flash fire re-directs the troops to pass through one or more areas in a proximity of the fire point.

In this manner, the method enables the user to control deployment of the troops, thereby enabling the user to define a war strategy as per his/her desire.

Moreover, the method may include an optional step at which a cost of usage of the supplemental fire is levied. The method may also include an optional step at which the cost of usage is increased with each usage of the supplemental fire and/or after the supplemental fires has been used a predefined number of times.

Moreover, the method may include additional steps at which changes in status of the one or more user-selectable graphical objects are substantially continuously recorded and updated in a database coupled to the software product; and the status of the one or more user-selectable graphical objects are resumed to their last updated status in the database, in case of interruptions in the operations of the graphical user interface.

Furthermore, the method may include additional steps at which a plurality of electronic devices are coupled in communication with a server via a communication network; and graphical user interfaces are generated temporally concurrently on display screens of the plurality of electronic devices. The graphical user interfaces are coordinated through the server, and updated on the plurality of electronic devices concurrently with time, to facilitate interactions of a plurality of users with the graphical user interfaces. Beneficially, the method is implemented to facilitate an online multiplayer gaming system.

The steps 1002 to 1010 are only illustrative and other alternatives can also be provided where one or more steps are added, one or more steps are removed, or one or more steps are provided in a different sequence without departing from the scope of the claims herein.

Furthermore, the method may include additional steps at which a second view of the map is presented on the graphical user interface, wherein the second view of the map displays one or more user-owned territories and one or more enemy territories. This enables a user to select one of the one or more enemy territories to be attacked.

As illustrated in FIGS. 8A, 8B and 8C, the second view of the map includes one or more visible areas and one or more at-least-partially-hidden areas. The method may include additional steps at which a user-selectable map-resource object is presented on the graphical user interface; a user's selection of the user-selectable map-resource object is detected; and consequently, a third view of the map is presented on the graphical user interface. At least one of the one or more at-least-partially-hidden areas of the second view of the map is made visible on the third view of the map, based at least partially upon the user's selection of the user-selectable map-resource object. For example, the at least one of the one or more at-least-partially-hidden areas is made visible when the user-selectable map-resource object is upgraded.

Embodiments of the present disclosure provide a software product stored on non-transitory (non-transient) machine-readable data storage media, wherein the software product is executable upon the computing hardware of an electronic device, such as the electronic device 300 or one of the electronic devices 202, for implementing the method as described in conjunction with FIG. 10. The software product is optionally, for example, downloadable from a software application store, for example from an "App store", to the electronic device.

Embodiments of the present disclosure are susceptible to being used for various purposes, including, though not limited to, enabling users to control deployment of troops, thereby enabling the users to define a war strategy as per their desire; facilitating optimal usage of supplemental fires; and facilitating a balance in an economic system between opponent users.

Modifications to embodiments of the present disclosure described in the foregoing are possible without departing from the scope of the present disclosure as defined by the accompanying claims. Expressions such as "including", "comprising", "incorporating", "consisting of", "have", "is"

used to describe and claim the present disclosure are intended to be construed in a non-exclusive manner, namely allowing for items, components or elements not explicitly described also to be present. Reference to the singular is also to be construed to relate to the plural.

We claim:

1. An electronic device comprising:
   a display screen; and
   a computing hardware configured to execute a software product, wherein executing the software product by the computer hardware causes the computer hardware to generate and render a graphical user interface on the display screen, the graphical user interface being configured to facilitate user interactions, the computing hardware, the software product and the graphical user interface being implemented on a gaming system, the gaming system comprising a game, wherein the software product, when executed on the computing hardware, is configured to:
   present a first view on the graphical user interface, the first view including at least a first shore region, a second land region and a third control region, wherein the third control region is separated from the first shore region and the second land region;
   present, in the third control region, a first set of one or more user-selectable graphical objects corresponding to troop transport units;
   detect a user's selection of one of the one or more of the user-selectable graphical objects from the first set in the third region;
   detect a user's selection of a deploy point in the first region;
   execute a deployment of the selected one of the one or more of the user-selectable graphical objects from the first set by causing the selected one of the one or more user-selectable graphical objects to be presented in a free space near the selected deploy point in the first shore region;
   generate in the first shore region a set of troop unit graphical objects presented on the display in a proximity to the deployed one of the one or more user-selectable graphical objects from the first set and cause individual ones of the troop unit graphical objects from the first set to move along a first route away from the first shore region and toward an object in the second land region;
   determine that the object in the second region of the first view is a defense object that is configured to apply a defense mechanism against at least one of the troop unit graphical objects moving along the first route;
   responsive to determining that the object in the second region is a defence object, detect a selection of one or more user-selectable graphical objects from a second set of user-selectable objects in the third control region, the second set being different from the first set and the second set being associated with an executable function;
   detect a selection of a fire point in the second land region;
   cause an execution of an action at the selected fire point in the second land region corresponding to the executable function; and
   responsive to the execution of the action at the selected fire point redirect the movement of troop unit graphical objects from the first route to a second route, the second route being directed towards the selected fire point; and
   levy a cost associated with the execution of the action, wherein the levied cost varies as a function of a number of executions of the action.

2. The electronic device of claim 1, wherein the second set of the one or more user-selectable graphical objects further comprise one or more supplemental fires, and wherein the software product, when executed on the computing hardware, is configured to:
   detect a user's selection of one of the one or more supplemental fires to be fired from the third control region;
   detect a user's selection of the fire point in the second land region;
   execute firing of the one of the one or more supplemental fires on the selected fire point;
   redirect the movement of the troop unit graphical objects from the first path towards the object and to the second path towards the selected fire point; and
   levy a cost of usage of the firing of the one of the one or more supplemental fires, wherein the levied cost varies as a function of a number of firings of the one or more supplemental fires.

3. The electronic device of claim 2, wherein the one of the one or more supplemental fires is a flash fire, and wherein the flash fire re-directs the set of troop unit graphical objects to change direction and pass through one or more areas in a proximity of the fire point along the second route.

4. The electronic device of claim 2, wherein the variation in the cost of usage increases, decreases or randomly changes for each usage of the one of the one or more supplemental fires.

5. The electronic device of claim 2, wherein the cost of usage increases with each usage of the one of the one or more supplemental fires.

6. The electronic device of claim 2, wherein the cost of usage increases after the one of the one or more supplemental fires has been used a predefined number of times.

7. The electronic device of claim 1, wherein the software product, when executed on the computing hardware, is configured to:
   present a map over the first region and the second region on the graphical user interface, wherein the map displays one or more user-owned territories and one or more enemy territories; and
   enable a user's selection of one of the one or more enemy territories as the deploy point in the first region to be attacked.

8. The electronic device of claim 7, wherein the map over the second region comprises one or more visible areas and one or more at-least-partially-hidden areas, and wherein the software product, when executed on the computing hardware, is configured to:
   present a user-selectable map-resource object on the graphical user interface;
   detect a user's selection of the user-selectable map-resource object; and
   present another view of the map on the graphical user interface, wherein at least one of the one or more at-least-partially-hidden areas of the second region of the map is made visible on the another view of the map, based at least partially upon the user's selection of the user-selectable map-resource object.

9. The electronic device of claim 8, wherein the user-selectable map-resource object comprises a radar, and wherein the software product, when executed on the computing hardware, is configured to:

present a user-selectable upgrade option on the graphical user interface;
detect a user's selection of the user-selectable upgrade option; and
upgrade the user-selectable map-resource object, based at least partially upon the user's selection of the user-selectable upgrade option, wherein the at least one of the one or more at-least-partially-hidden areas is made visible when the user-selectable map-resource object is upgraded.

10. The electronic device of claim 8, wherein the software product, when executed on the computing hardware, is configured to levy a cost of usage of the user-selectable map-resource object based on a type of the user-selectable map-resource based object.

11. The electronic device of claim 1 further comprising a user input interface rendered over the graphical user interface, the user input interface being configured to detect an input corresponding to moving a pointer object, clicking or tapping the pointer object, or swiping a touch-sensitive object over the graphical user interface.

12. The electronic device of claim 1 further comprising a database for substantially continuously recording and updating changes in status of the one or more user-selectable graphical objects, wherein the software product, when executed on the computing hardware, is coupled to the database and is configured to resume the status of the one or more user-selectable graphical objects to their last updated status in the database, in case of interruptions in the operable state of the graphical user interface.

13. A plurality of electronic devices of claim 1, coupled in communication with a server via a communication network, graphical user interfaces being generated temporally concurrently on display screens of the plurality of electronic devices, to facilitate interactions of a plurality of users with the graphical user interfaces, wherein the graphical user interfaces generated on the plurality of electronic devices are coordinated and synchronized through the server, and updated on the plurality of electronic devices concurrently with time.

14. A method of facilitating user interactions with a graphical user interface, the graphical user interface being generated and rendered on a display screen of an electronic device by executing a software product on a computing hardware of the electronic device, the computing hardware, the software product and the graphical user interface being implemented on a gaming system, the gaming system comprising a war strategy game, the method comprising:
presenting a first view of a map on the graphical user interface, wherein the first view of the map displays an enemy territory and includes a first region, a second region and a third region, wherein the third region is separated from the first region and the second region;
presenting a first set of one or more user-selectable graphical objects in the third region on the graphical user interface, wherein the first set of one or more user-selectable graphical objects comprise one or more troop transportation units;
detecting a user's selection in the third region of at least one of the one or more troop transportation units to be deployed to the first region and attack a position in the second region of the enemy territory;
detecting a user's selection of a deploy point in the first region of the enemy territory, wherein the selected deploy point corresponds to a type of the selected troop transportation unit; and
executing deployment of the selected troop transportation units by presenting the selected troop transportation units in a free area in a proximity of the selected deploy point in the first region of the enemy territory, and cause another set of graphical objects comprising troops to emerge from the deployed one of the one or more troop transportation units and enter the second region of the enemy territory along a first route from free areas in the proximity of the selected deploy point, and towards an object in the second region;
detect a selection of at least one user-selectable graphical object from a second set of one or more user-selectable graphical objects in the third region, the second set being different from the first set and being associated with an executable function;
detect a selection of a fire point in the second region;
cause an execution of an action at the fire point in the second region corresponding to the executable function;
levy a cost associated with the execution of the action, wherein the levied cost varies as a function of a number of executions of the action; and
after execution of the action at the fire point, cause the troops to redirect from the first route towards the object to a second route towards the fire point in the second region.

15. The method of claim 14, wherein the second set of one or more user-selectable graphical objects further comprise one or more supplemental fires, and wherein the method further comprises:
detecting a user's selection of one of the one or more supplemental fires to be fired;
detecting a user's selection of the fire point on the enemy territory in the second region;
executing firing of the one of the one or more supplemental fires on the fire point selected on the enemy territory;
redirect the movement of the troop towards the fire point; and
levying a cost of usage of the firing of the one of the one or more supplemental fires, wherein the levied cost varies as a function of a number of executions of the action.

16. The method of claim 15, wherein the one of the one or more supplemental fires is a flash fire, and wherein the flash fire re-directs the troops to pass through one or more areas in a proximity of the fire point along the second route.

17. The method of claim 15, wherein the cost of usage is substantially different for each usage of the one of the one or more supplemental fires.

18. The method of claim 15 further comprising increasing the cost of usage with each usage of the one of the one or more supplemental fires.

19. The method of claim 15 further comprising increasing the cost of usage after the one of the one or more supplemental fires has been used a predefined number of times.

20. The method of claim 14 further comprising:
presenting a second view of the map on the graphical user interface, wherein the second view of the map displays one or more user-owned territories and one or more enemy territories; and
enabling a user's selection of one of the one or more enemy territories to be attacked.

21. The method of claim 20, wherein the second view of the map comprises one or more visible areas and one or more at-least-partially-hidden areas, and wherein the method further comprises:

presenting a user-selectable map-resource object on the graphical user interface;

detecting a user's selection of the user-selectable map-resource object; and presenting a third view of the map on the graphical user interface, wherein at least one of the one or more at-least-partially-hidden areas of the second view of the map is made visible on the third view of the map, based at least partially upon the user's selection of the user-selectable map-resource object.

22. The method of claim 21 further comprising:

presenting a user-selectable upgrade option on the graphical user interface;

detecting a user's selection of the user-selectable upgrade option; and upgrading the user-selectable map-resource object, based at least partially upon the user's selection of the user-selectable upgrade option, wherein the at least one of the one or more at-least-partially-hidden areas is made visible when the user-selectable map-resource object is upgraded.

23. The method of claim 21 further comprising levying a cost of usage of the user-selectable map-resource object, wherein the cost of usage varies as a function of the usage by one of increasing, decreasing or randomly varying.

24. The method of claim 14 further comprising:

coupling the software product to a database;

substantially continuously recording and updating changes in status of the one or more user-selectable graphical objects in the database; and resuming the status of the one or more user-selectable graphical objects to their last updated status in the database, in case of interruptions in the operations of the graphical user interface.

25. The method of claim 14 further comprising:

coupling a plurality of electronic devices in communication with a server via a communication network;

generating graphical user interfaces temporally concurrently on display screens of the plurality of electronic devices;

coordinating the graphical user interfaces through the server; and updating the graphical user interfaces on the plurality of electronic devices concurrently with time, to facilitate interactions of a plurality of users with the graphical user interfaces.

26. The method of claim 25, wherein the method is implemented to facilitate an online multiplayer gaming system.

27. A software product stored on non-transitory machine-readable data storage media, wherein the software product is executable upon computing hardware of an electronic device for implementing the method of claim 14.

28. The software product of claim 27, wherein the software product is downloadable from a software application store to the electronic device.

* * * * *